United States Patent
Nalci et al.

(10) Patent No.: US 11,638,036 B2
(45) Date of Patent: Apr. 25, 2023

(54) HIGH-LEVEL CONSTRAINTS FOR TRANSFORM SKIP BLOCKS IN VIDEO CODING

(71) Applicant: QUALCOMM Incorporated, San Diego, CA (US)

(72) Inventors: Alican Nalci, La Jolla, CA (US); Marta Karczewicz, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/220,829

(22) Filed: Apr. 1, 2021

(65) Prior Publication Data

US 2021/0314625 A1    Oct. 7, 2021

Related U.S. Application Data

(60) Provisional application No. 63/012,134, filed on Apr. 18, 2020, provisional application No. 63/005,127, filed on Apr. 3, 2020.

(51) Int. Cl.
*H04N 19/70*  (2014.01)
*H04N 19/124*  (2014.01)
(Continued)

(52) U.S. Cl.
CPC ........... *H04N 19/70* (2014.11); *H04N 19/124* (2014.11); *H04N 19/174* (2014.11); *H04N 19/176* (2014.11); *H04N 19/46* (2014.11)

(58) Field of Classification Search
CPC ..... H04N 19/124; H04N 19/176; H04N 19/70
See application file for complete search history.

(56) References Cited

U.S. PATENT DOCUMENTS

2015/0103917 A1    4/2015  Wang et al.
2021/0160479 A1*   5/2021  Hsiang ................ H04N 19/172
(Continued)

OTHER PUBLICATIONS

Bross B., et al., "Versatile Video Coding (Draft 6)", 127, MPEG Meeting, Jul. 8, 2019- Jul. 12, 2019, Gothenburg, (Motion Picture Expert Group or ISO/IEC JTC1/SC29/WG11), Gothenburg SE No. JVET-O2001-VE, M49908, Jul. 31, 2019 (Jul. 31, 2019), pp. 1-456, XP030208568, Retrieved from the Internet: URL: http://phenix.int-evry.fr/mpeg/doc_end_user/documents/127_Gothenburg/wg11/m49908-JVET-O2001-v14-JVET-O2001-vE.zip. JVET-O2001-vE. docx [retrieved on Jul. 31, 2019].
(Continued)

*Primary Examiner* — Zhubing Ren
(74) *Attorney, Agent, or Firm* — Shumaker & Sieffert, P.A.

(57) ABSTRACT

An example device includes memory and one or more processors implemented in circuitry and communicatively coupled to the memory. The one or more processors are configured to receive a first slice header syntax element for a slice of the video data and determine a first value for the first slice header syntax element, the first value being indicative of whether dependent quantization is enabled. The one or more processors are configured to receive a second slice header syntax element for the slice of the video data and determine a second value for the second slice header syntax element, the second value being indicative of whether sign data hiding is enabled. The one or more processors are configured to determine whether transform skip residual coding is disabled for the slice based on the first value and the second value and decode the slice based on the determinations.

32 Claims, 8 Drawing Sheets

(51) Int. Cl.
*H04N 19/174* (2014.01)
*H04N 19/176* (2014.01)
*H04N 19/46* (2014.01)

(56) References Cited

U.S. PATENT DOCUMENTS

2021/0266598 A1* 8/2021 Hashimoto .......... H04N 19/132
2021/0306623 A1* 9/2021 Sarwer ................ H04N 19/70
2021/0321138 A1* 10/2021 Samuelsson ........ H04N 19/174

OTHER PUBLICATIONS

Bross B., et al., "Versatile Video Coding (Draft 8)", 17, JVET Meeting, Jan. 7, 2020-Jan. 17, 2020, Brussels, BE (The Joint Video Exploration Team of ISO/IEC JTC1/SC29/WG11 and ITU-T SG.16), No. JVET-Q2001-vE, JVET-Q2001, Mar. 12, 2020 (Mar. 12, 2020), 515 pages, XP030285390, Retrieved from the Internet: URL: http://phenix.int-evry.fr/jvet/doc_end_user/documents/17_Brussels/wg11/JVET-Q2001-v15.zip JVET-Q2001-vE.docx [retrieved on Mar. 12, 2020] cited in the application Section 7.3.10.5 Coding unit syntax, the whole document.
International Search Report and Written Opinion—PCT/US2021/025588—ISA/EPO—dated Jul. 14, 2021.
Nalci A., et al., "AHG9: High-Level Constraints on Dependent Quantization and Sign Data Hiding", JVET-R0271-v1, Joint Video Experts Team (JVET) of ITU-T SG 16 WP3 and ISO/IEC JTC 1/SC 29/WG 11, 18th Meeting: by Teleconference, Apr. 15-24, 2020, Apr. 4, 2020 (Apr. 4, 2020), XP030286333, pp. 1-4, Retrieved from the Internet: URL: http://phenix.int-evry.fr/mpeg/doc_end_user/documents/130_Alpbach/wg11/m53248-JVET-R0271-v1-JVET-R0271-v1.zip. JVET-R0271-v1.docx [retrieved on Apr. 4, 2020] the whole document.
Nalci (Qualcomm) A., et al., "AHG14: Residual Coding Constraints for Transform Skip Blocks", 130. MPEG Meeting, Apr. 20, 2020-Apr. 24, 2020, Alpbach, (Motion Picture Expert Group or ISO/IEC JTC1/SC29/WG11), No. m53046, JVET-R0083-V3, Apr. 14, 2020 (Apr. 14, 2020), XP030285847, pp. 1-9, Retrieved from the Internet: URL: http://phenix.int-evry.fr/mpeg/doc_end_user/documents/130_Alpbach/wg11/m53046-JVET-R0083-v3-JVET-R0083-v3.zip JVET-R0083-v3.docx [retrieved on Apr. 14, 2020] the Whole Document.
Samuelsson (SharpLabs) J., et al., "On TSRC, DQ and SOH signalling", 130, MPEG Meeting, Apr. 20, 2020-Apr. 24, 2020, Alpbach, (Motion Picture Expert Group or ISO/IEC JTC1/SC29/WG11) No. M53950, JVET-R0486, Apr. 22, 2020 (Apr. 22, 2020), XP030287858, 4 Pages, Retrieved from the Internet: URL: http://phenix.int-evry.fr/mpeg/doc_end_user/documents/130_Alpbach/wg11/m53950-JVET-R0486-v2-JVET-R0486.zip. JVET-R0486-v2.docx [retrieved on Apr. 22, 2020] the whole document.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 1. JVET Meeting, Oct. 19-21, 2015, Geneva (The Joint Video Exploration Team of ISO/IEC JTC1/SC29/WG11 and ITU-T SG.16 WP 3), No. H.266 JVET-A1001, Feb. 24, 2016 (Feb. 24, 2016), XP030150000, 27 Pages, URL: http://phenix.int-evry.fr/vet/.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Nalci (Qualcomm) A., et al., "AHG9: High-Level Constraints of Dependent Quantization and Sign Data Hiding", 130. MPEG Meeting, Apr. 20, 2020-Apr. 24, 2020, Alpbach, (Motion Picture Expert Group or ISO/IEC JTC1/SC29/NG11), No. m53248, JVET-R0271-v3, Apr. 19, 2020 (Apr. 19, 2020), XP030286336, pp. 1-4. Retrieved from the Internet: URL:http://phenix.int-evry.fr/mpeg/doc_end_user/documents/130_Alpbach/wg11/m53248-JVET-R0271-v3-JVET-R0271-V3.zip JVET-R0271-v3.docx [retrieved on Apr. 19, 2020].
Bross B., et al., "Versatile Video Coding (Draft 8)," 17. JVET Meeting; Jan. 7, 2020-Jan. 17, 2020, Brussels, BE; (The Joint Video Exploration Team of ISO/IEC JTC1/SC29/WG11 AND ITU-TSG. 16), No. JVET-Q2001-vD, Feb. 27, 2020 (Feb. 27, 2020), XP030285389, 514 Pages.
Chen J., et al., "Algorithm Description for Versatile Video Coding and Test Model 8 (VTM 8)", JVET-Q2002-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-94.
Nalci A., et al., "CE3-2.4: Luma and Chroma BDPCM for Lossless Coding with Regular Residual Coding", JVET-20089-1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-3.

* cited by examiner

HIGH-LEVEL CONSTRAINTS FOR TRANSFORM SKIP BLOCKS IN VIDEO CODING

This application claims priority to U.S. Provisional Patent Application 63/005,127, filed Apr. 3, 2020, and to U.S. Provisional Patent Application 63/012,134, filed Apr. 18, 2020, the entire content of both of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, mobile devices (such as cellular or satellite radio telephones, or so-called "smart phones"), video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for high-level restrictions that may be imposed for dependent quantization (DQ), sign data hiding (SDH), and a syntax element indicative of whether transform skip (TS) residual coding is enabled or disabled for a slice of video data. In some examples, this disclosure describes configuring a video encoder and video decoder to disallow the use of DQ and SDH for blocks of video data that have TS residuals which use transform residual coding (TRC). This disallowing the use of DQ and SDH for blocks having TS residuals which use TRC may prevent otherwise lossless coding operations from becoming lossy. The techniques of this disclosure may be implemented in video coding standards, such as Versatile Video Coding (VVC), or future standards.

In one example, a method includes receiving a first slice header syntax element for a slice of the video data, determining a first value for the first slice header syntax element, wherein the first value is indicative of whether dependent quantization is enabled for the slice, receiving a second slice header syntax element for the slice of the video data, determining a second value for the second slice header syntax element, wherein the second value is indicative of whether sign data hiding is enabled for the slice, determining whether transform skip residual coding is disabled for the slice based on the first value and the second value, and decoding the slice based on the determinations.

In another example, a device includes memory and one or more processors implemented in circuitry and communicatively coupled to the memory, the one or more processors being configured to receive a first slice header syntax element for a slice of the video data, determine a first value for the first slice header syntax element, wherein the first value is indicative of whether dependent quantization is enabled for the slice, receive a second slice header syntax element for the slice of the video data, determine a second value for the second slice header syntax element, wherein the second value is indicative of whether sign data hiding is enabled for the slice, determine whether transform skip residual coding is disabled for the slice based on the first value and the second value, and decode the slice based on the determinations.

In another example, a device includes means for receiving a first slice header syntax element for a slice of the video data, means for determining a first value for the first slice header syntax element, wherein the first value is indicative of whether dependent quantization is enabled for the slice, means for receiving a second slice header syntax element for the slice of the video data, means for determining a second value for the second slice header syntax element, wherein the second value is indicative of whether sign data hiding is enabled for the slice, means for determining whether transform skip residual coding is disabled for the slice based on the first value and the second value, and means for decoding the slice based on the determinations.

In another example, a non-transitory computer-readable storage medium having stored thereon instructions that, when executed, cause one or more processors to receive a first slice header syntax element for a slice of the video data, determine a first value for the first slice header syntax element, wherein the first value is indicative of whether dependent quantization is enabled for the slice, receive a second slice header syntax element for the slice of the video data; determine a second value for the second slice header syntax element, wherein the second value is indicative of whether sign data hiding is enabled for the slice, determine whether transform skip residual coding is disabled for the slice based on the first value and the second value, and decode the slice based on the determinations.

In another example, a method includes determining whether to enable dependent quantization for a slice of the video data, determining whether to enable sign data hiding for the slice, based on the determination of whether to enable dependent quantization for the slice or the determination of whether to enable sign data hiding for the slice, determining whether to disable transform skip residual coding for the slice, and encoding the slice based on the determinations.

In another example, a device includes memory and one or more processors implemented in circuitry and communicatively coupled to the memory, the one or more processors being configured to determine whether to enable dependent quantization for a slice of the video data, determine whether to enable sign data hiding for the slice, based on the determination of whether to enable dependent quantization for the slice or the determination of whether to enable sign data hiding for the slice, determine whether to disable transform skip residual coding for the slice, and encode the slice based on the determinations.

The details of one or more examples are set forth in the accompanying drawings and the description below. Other features, objects, and advantages will be apparent from the description, drawings, and claims.

DETAILED DESCRIPTION

Figure 1:
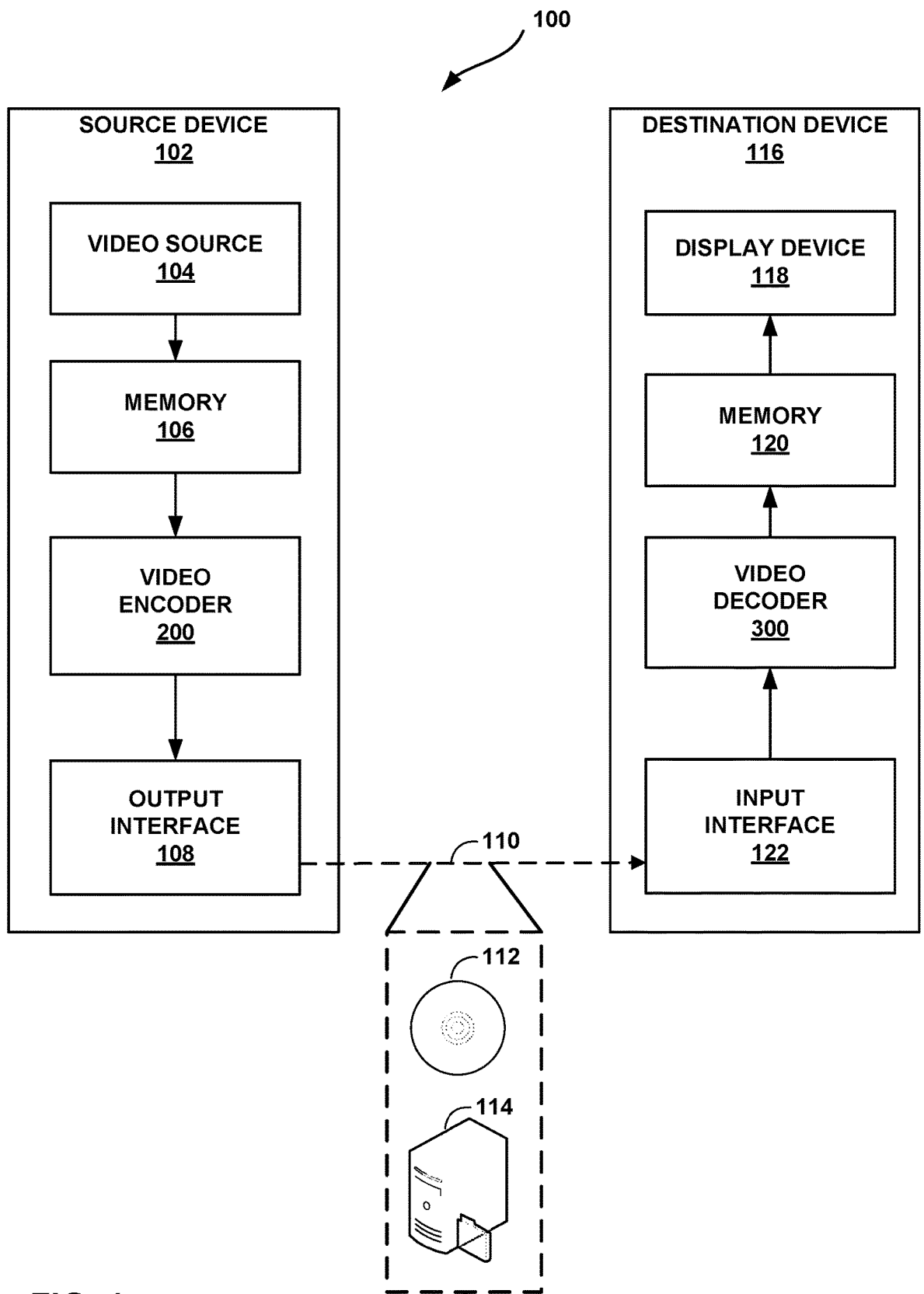
FIG. 1 is a block diagram illustrating an example video encoding and decoding system that may perform the techniques of this disclosure.

In some draft video standards, certain lossy coding tools may be enabled for what otherwise may be lossless coding. For example, in a draft video coding standard, there are two available residual coding processes, referred to as transform residual coding (TRC) and transform skip residual coding (TSRC). When TSRC is enabled, a transform skip (TS) block is typically coded using the TSRC process, but there are some coding scenarios where TSRC may be disabled. When TSRC is disabled, a TS block may be coded using the TRC process. When TSRC is disabled (e.g., TRC is to be applied to TS blocks), lossy tools, such as dependent quantization (DQ) and sign data hiding (SDH) may still be invoked for TS blocks. Generally, when a block is a TS block (which is indicated by a TS flag), that block is intended to be losslessly coded. However, applying TRC to a TS block may be problematic because DQ and SDH are implicitly lossy operations. Therefore, a video encoder and video decoder typically should not use DQ and SDH on a block that has TS residuals to ensure lossless coding.

According to the techniques of this disclosure, a video encoder and video decoder may be configured to disallow the use of DQ and SDH when a syntax element indicative of whether TSRC coding is disabled for a slice of video data is true, such as when slice_ts_residual_coding_disabled_flag, discussed in more detail below, is equal to 1. That is, according to the techniques of this disclosure, a video encoder and video decoder may be configured such that TSRC is only disabled in coding scenarios where both DQ and SDH are also disabled, or phrased in the alternative, a video encoder and video decoder may be configured such that TSRC is enabled if at least one of DQ or SDH are also enabled. This may prevent coding scenarios where TS blocks are coded using TRC and become lossy when a lossless mode of operation is desired.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder may transform and quantize the residual data and signal the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

In some coding scenarios, a video encoder may encode video data in a transform skip mode in which the transform process described above is not performed, i.e., the transform process is skipped. Thus, for a block encoded in a transform skip mode, the residual data is not transformed. A residual block of video data encoded using a transform skip mode may also be referred to as an untransformed residual block. This disclosure describes techniques for implementing and signaling DQ, SDH, and TSRC.

According to the techniques of this disclosure, a video encoder and video decoder may be configured to disallow the use of DQ and SDH when a syntax element indicative of whether TSRC coding is disabled for a slice of video data is true. That is, according to the techniques of this disclosure, a video encoder and video decoder may be configured such that TSRC is only disabled in coding scenarios where both DQ and SDH are also disabled, or phrased in the alternative, a video encoder and video decoder may be configured such that TSRC is enabled if at least one of DQ or SDH are also enabled. This prevents coding scenarios where TS blocks are coded using TRC and become lossy when a lossless mode of operation is desired. For example, a video decoder may receive a first slice header syntax element for a slice of the video data, determine a first value for the first slice header syntax element, wherein the first value is indicative of whether dependent quantization is enabled for the slice, receive a second slice header syntax element for the slice of the video data, determine a second value for the second slice header syntax element, wherein the second value is indicative of whether sign data hiding is enabled for the slice, determine whether transform skip residual coding is disabled for the slice based on the first value and the second value, and decode the slice based on the determinations. In this manner, the video decoder may prevent the application of lossy coding tools to what otherwise would be a lossless coded block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for high-level restrictions that may be imposed for DQ, SDH, and slice_ts_residual_coding_disabled_flag in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for high-level restrictions that may be imposed for DQ, SDH, and slice_ts_residual_coding_disabled_flag in video coding standards. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-v15 (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Although the above describes examples where transforms are preformed, in some examples, the transform may be skipped. For instance, video encoder 200 may implement transform skip mode in which the transform operation is skipped. In examples where transform is skipped, video encoder 200 may output coefficients corresponding to residual values instead of transform coefficients. In the following description, the term "coefficient" should be interpreted to include either coefficients corresponding to residual values or transform coefficients generated from the result of a transform. Similarly, the term "coefficient block" should be interpreted to include either a block of residual values or a block of transform coefficients generated from the result of a transform.

As noted above, following transform or transform skip to produce coefficients, video encoder 200 may perform quantization of the coefficients. Quantization generally refers to a process in which coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the coefficients, producing a one-dimensional vector from the two-dimensional matrix including the quantized transform coefficients. For blocks coded with a transform, the scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized coefficients to produce a serialized vector, and then entropy encode the quantized coefficients of the vector. In other examples, video encoder 200 may perform an adaptive scan. After scanning the quantized coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized coefficients. Video decoder 300 may inverse quantize and inverse transform the quantized coefficients of a block to reproduce a residual block for the block. For blocks coded in transform skip mode, video decoder 300 skips the inverse transform process. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes receiving a first slice header syntax element for a slice of the video data, determining a first value for the first slice header syntax element, wherein the first value is indicative of whether dependent quantization is enabled for the slice, receiving a second slice header syntax element for the slice of the video data, determining a second value for the second slice header syntax element, wherein the second value is indicative of whether sign data hiding is enabled for the slice, determining whether transform skip residual coding is disabled for the slice based on the first value and the second value, and decoding the slice based on the determinations.

In accordance with the techniques of this disclosure, a device includes memory configured to store the video data, and one or more processors implemented in circuitry and coupled to the memory, the one or more processors being configured to receive a first slice header syntax element for a slice of the video data, determine a first value for the first slice header syntax element, wherein the first value is indicative of whether dependent quantization is enabled for the slice, receive a second slice header syntax element for the slice of the video data, determine a second value for the second slice header syntax element, wherein the second value is indicative of whether sign data hiding is enabled for the slice, determine whether transform skip residual coding is disabled for the slice based on the first value and the second value, and decode the slice based on the determinations.

In accordance with the techniques of this disclosure, a device includes means for receiving a first slice header syntax element for a slice of the video data, means for determining a first value for the first slice header syntax element, wherein the first value is indicative of whether dependent quantization is enabled for the slice, means for receiving a second slice header syntax element for the slice of the video data, means for determining a second value for the second slice header syntax element, wherein the second value is indicative of whether sign data hiding is enabled for the slice, means for determining whether transform skip residual coding is disabled for the slice based on the first value and the second value, and means for decoding the slice based on the determinations.

In accordance with the techniques of this disclosure, a non-transitory computer-readable storage medium having stored thereon instructions that, when executed, cause one or more processors to receive a first slice header syntax element for a slice of the video data, determine a first value for the first slice header syntax element, wherein the first value is indicative of whether dependent quantization is enabled for the slice, receive a second slice header syntax element for the slice of the video data; determine a second value for the second slice header syntax element, wherein the second value is indicative of whether sign data hiding is enabled for the slice, determine whether transform skip residual coding is disabled for the slice based on the first value and the second value, and decode the slice based on the determinations.

In accordance with the techniques of this disclosure, a method includes determining whether to enable dependent quantization for a slice of the video data, determining whether to enable sign data hiding for the slice, based on the determination of whether to enable dependent quantization for the slice or the determination of whether to enable sign data hiding for the slice, determining whether to disable transform skip residual coding for the slice, and encoding the slice based on the determinations.

In accordance with the techniques of this disclosure, a device includes memory and one or more processors implemented in circuitry and communicatively coupled to the memory, the one or more processors being configured to determine whether to enable dependent quantization for a slice of the video data, determine whether to enable sign data hiding for the slice, based on the determination of whether to enable dependent quantization for the slice or the determination of whether to enable sign data hiding for the slice, determine whether to disable transform skip residual coding for the slice, and encode the slice based on the determinations.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
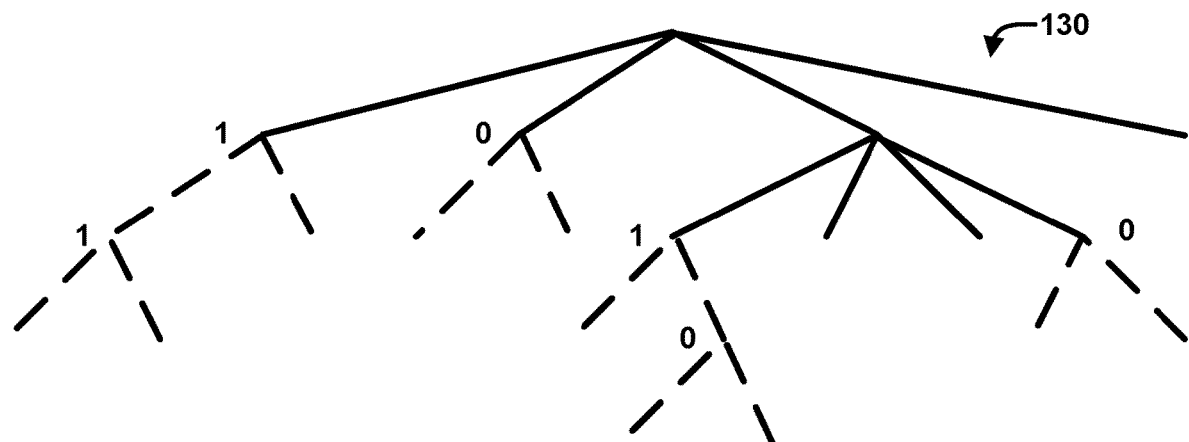
FIGS. 2A and 2B are conceptual diagrams illustrating an example quadtree binary tree (QTBT) structure, and a corresponding coding tree unit (CTU).
Figure 2B:
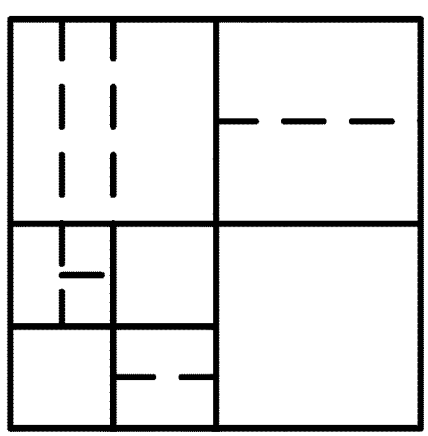

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. The binary tree node having a width equal to MinBTSize (4, in this example) implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
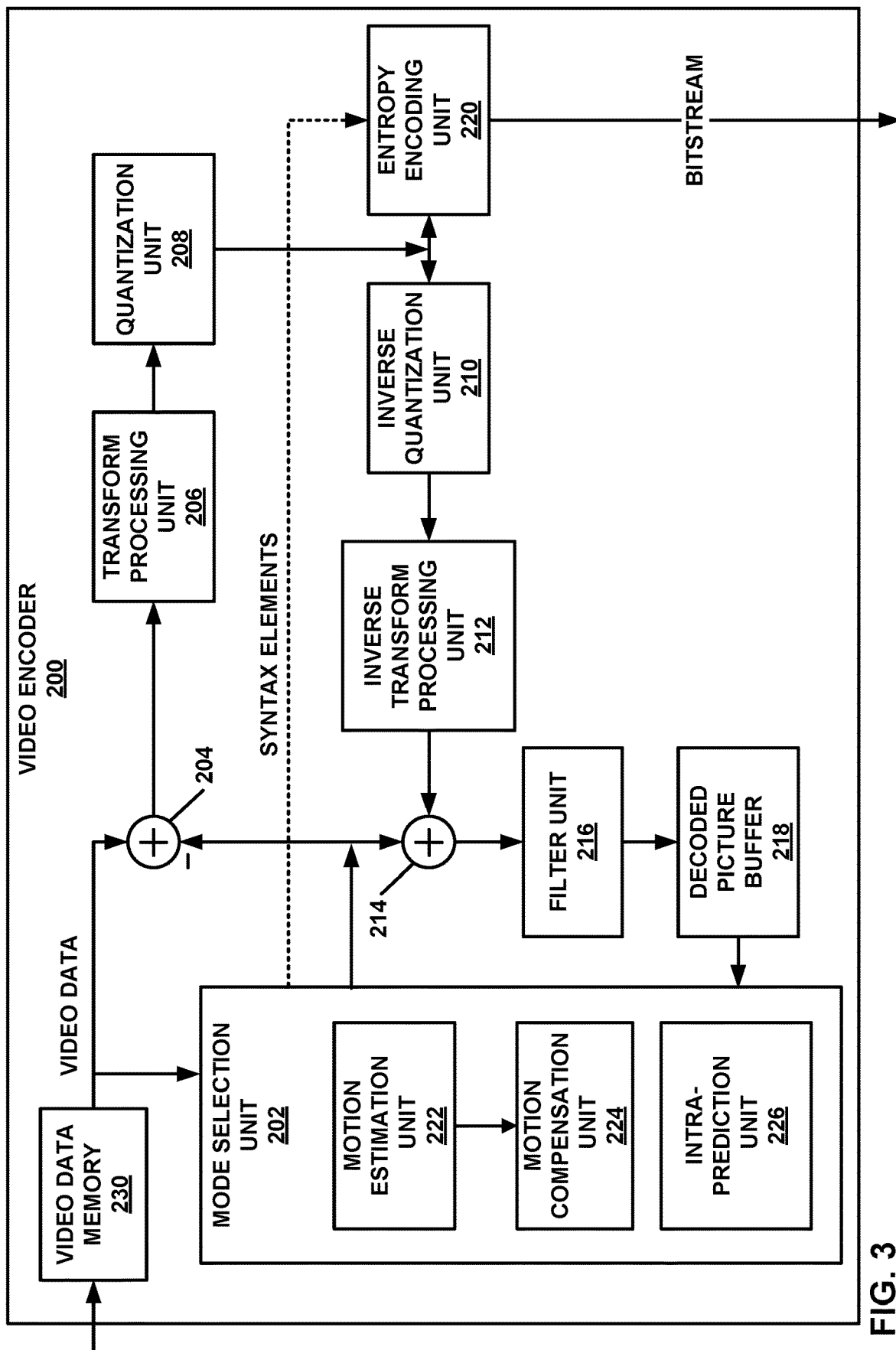
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. For blocks coded in transform skip mode, transform processing unit 206 may be viewed as a pass through unit that does not alter received values.

In some examples, transform processing unit 206 and/or mode selection unit 202 may determine first value of a first slice header syntax element of a slice of the video data indicative of whether dependent quantization is enabled for the slice. Transform processing unit 206 and/or mode selection unit 202 may determine a second value of a second slice header syntax element of the slice indicative of whether sign data hiding is enabled for the slice. Transform processing unit 206 and/or mode selection unit 202 may also determine whether transform skip residual coding is disabled for the slice.

Quantization unit 208 may quantize the coefficients in a coefficient block, to produce a quantized coefficient block. Quantization unit 208 may quantize coefficients of a coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized coefficients may have lower precision than the original coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block. For blocks coded in transform skip mode, inverse transform processing unit 212 may be viewed as a pass through unit that does not alter received values.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including memory configured to store the video data; and one or more processors implemented in circuitry and coupled to the memory, the one or more processors being configured to: to determine whether to enable dependent quantization for a slice of the video data, determine whether to enable sign data hiding for the slice, based on the determination of whether to enable dependent quantization for the slice or the determination of whether to enable sign data hiding for the slice, determine whether to disable transform skip residual coding for the slice, and encode the slice based on the determinations.

Figure 4:
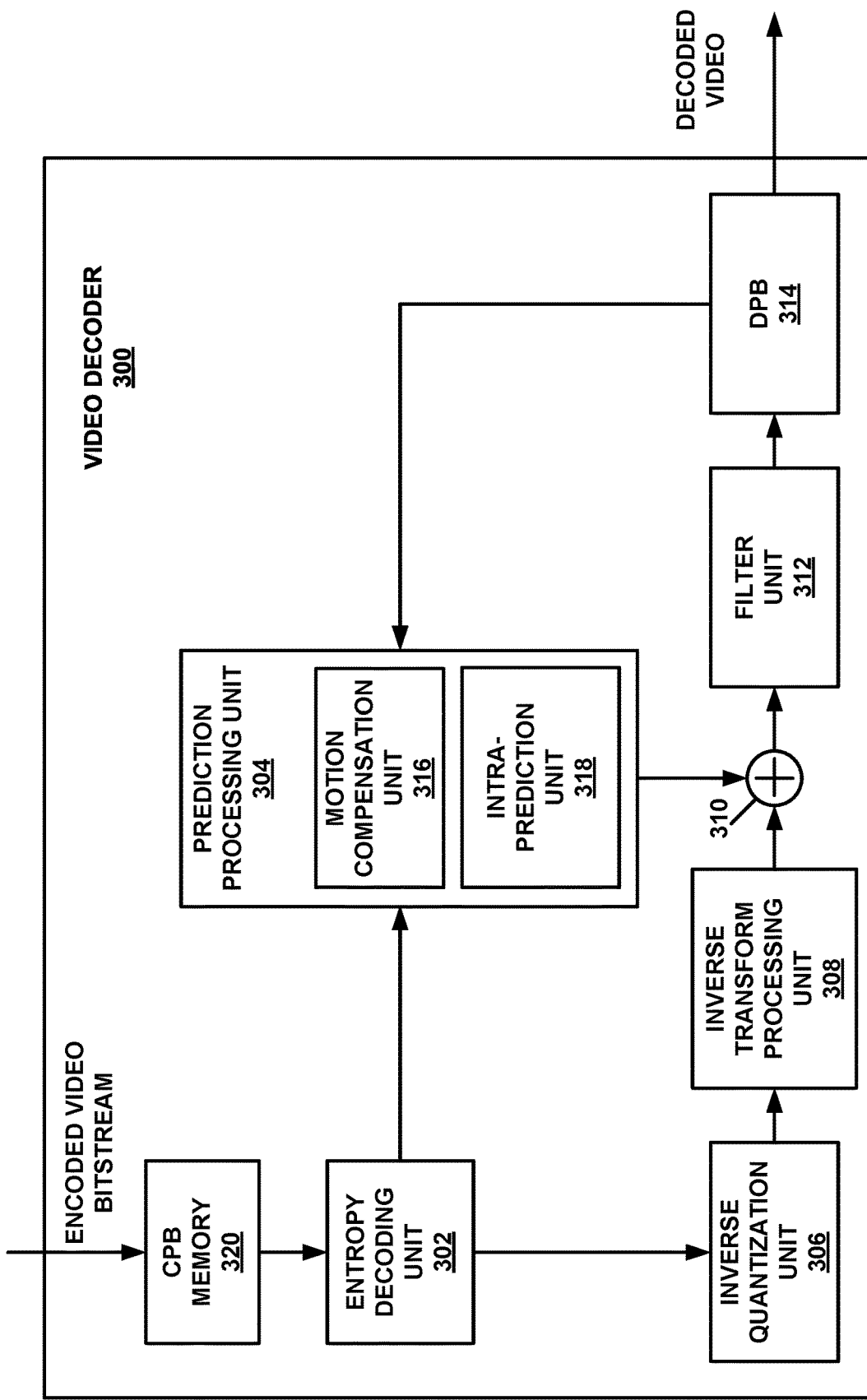
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized coefficients of a quantized coefficient block, as well as transform information, such as a quantization parameter (QP) and/or transform mode indication(s). Inverse quantization unit 306 may use the QP associated with the quantized coefficient block to determine a degree of quantization and, likewise, a degree of inverse quantization for inverse quantization unit 306 to apply. Inverse quantization unit 306 may, for example, perform a bitwise left-shift operation to inverse quantize the quantized coefficients. Inverse quantization unit 306 may thereby form a coefficient block including coefficients.

After inverse quantization unit 306 forms the coefficient block, inverse transform processing unit 308 may apply one or more inverse transforms to the coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block. For blocks coded in transform skip mode, inverse transform processing unit 308 may be viewed as a pass through unit that does not alter received values.

In some examples, inverse transform processing unit 308 and/or entropy decoding unit 302 may determine first value of a first slice header syntax element of a slice of the video data indicative of whether dependent quantization is enabled for the slice. Inverse transform processing unit 308 and/or entropy decoding unit 302 may determine a second value of a second slice header syntax element of the slice indicative of whether sign data hiding is enabled for the slice. Inverse transform processing unit 308 and/or entropy decoding unit 302 may determine whether transform skip residual coding is disabled for the slice.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for decoding video data including memory configured to store the video data; and one or more processors implemented in circuitry and coupled to the memory, the one or more processors being configured to receive a first slice header syntax element for a slice of the video data, determine a first value for the first slice header syntax element, wherein the first value is indicative of whether dependent quantization is enabled for the slice, receive a second slice header syntax element for the slice of the video data, determine a second value for the second slice header syntax element, wherein the second value is indicative of whether sign data hiding is enabled for the slice, determine whether transform skip residual coding is disabled for the slice based on the first value and the second value, and decode the slice based on the determinations.

This disclosure describes techniques to prevent otherwise lossless coding from becoming lossy. According to the techniques of this disclosure, high-level constraints related to the coding of transform skip blocks that use a transform residual coding scheme (e.g., residual_coding( ) in VVC Draft 8) may be employed. Specifically, use of dependent quantization and sign data hiding are prevented through high-level constraints when transform skip blocks use transform residual coding.

In VVC Draft 8, there are two available residual coding schemes. The first is TRC (e.g., residual_coding( ), and the second is TSRC (e.g., residual_coding_ts( ). In this example, residual_coding( ) and residual_coding_ts( ) represent two different syntax structures for parsing or processing residual samples. TRC and TSRC are thus two different schemes for coding transform residuals of a block of video data. TSRC should not be confused with TS mode as TSRC is a coding scheme that may be applied to residuals of a TS mode block.

TS is a mode in VVC which is signaled explicitly using the TS mode flag as part of multiple transform selection (MTS) signaling or implicitly selected if block differential pulse code modulation (BDPCM) mode is selected. If the TS flag is 1, TSRC is normally used for coefficient coding unless slice_ts_residual_coding_disabled_flag is equal to 1, in which case TRC is used to encode coefficients of a TS block. The signaling of slice_ts_residual_coding_disabled_flag is currently performed in the slice header. It should be noted that if the TS flag is 0 (e.g., the block is not a TS block) and slice_ts_residual_coding_disabled_flag is equal to 0, TRC may be applied to the block even though TSRC is enabled for the slice containing the block.

In VVC Draft 8, DQ and SDH are tools that were originally introduced to work with TRC. However, when slice_ts_residual_coding_disabled_flag is set to 1, DQ and SDH can be invoked for TS blocks as well. This may be problematic for lossless coding since lossless coding is based on the TS flag and DQ and SDH are implicitly lossy operations. Therefore, video encoder 200 and video decoder 300 should not use DQ and SDH on a block that has TS residuals to ensure lossless coding.

According to the techniques of this disclosure, the use of DQ and SDH may be disallowed at a higher level when a syntax element is indicative of TSRC being disabled, e.g., slice_ts_residual_coding_disabled_flag is equal to 1. This may prevent TS blocks that use TRC to become lossy when a lossless mode of operation is desired. Examples are provided below.

Example 1

In example 1, ph_dep_quant_enabled_flag and pic_sign_data_hiding_enabled_flag are moved from the picture header to the slice level after signaling of the slice_ts_residual_coding_disabled_flag. Then the signaling of the new slice_dep_quant_enabled_flag and slice_sign_data_hiding_enabled_flag is constrained based on the slice_ts_residual_coding_disabled_flag. In this case slice_dep_quant_enabled_flag and slice_sign_data_hiding_enabled_flag are not signaled (inferred to be 0) when slice_ts_residual_coding_disabled_flag=1. For example, video encoder 200 may not signal slice_dep_quant_enabled_flag and slice_sign_data_hiding_enabled_flag when slice_ts_residual_coding_disabled_flag=1 and video decoder 300 may infer signal slice_dep_quant_enabled_flag and slice_sign_data_hiding_enabled_flag to be 0 when slice_ts_residual_coding_disabled_flag=1.

Example specification text changes to VVC Draft 8 are provided below. The beginning of the removal of syntax elements is shown with <DELETE> and the end of the removals are marked with </DELETE> and beginning of additions/modifications are shown with <CHANGE> and the end of additions/modifications are marked with </CHANGE>.

| 7.3.2.7 Picture header structure syntax | |
|---|---|
| picture_header_structure( ) { | Descriptor |
| ... | |
| <DELETE> if( sps_dep_<br>quant_enabled_flag ) | |
|   ph_dep_quant_<br>  enabled_flag | u(1) |
| if( sps_sign_data_hiding_enabled_<br>flag && !ph_dep_quant_enabled_<br>flag ) | |
|   pic_sign_data_hiding_enabled_flag | u(1)<br></DELETE> |
| ... | |
| } | |

| 7.3.7.1 General slice header syntax | |
|---|---|
| slice_header( ) { | Descriptor |
| ... | |
|   slice_ts_residual_<br>  coding_disabled_flag | u(1) |
| <CHANGE>if( sps_dep_<br>quant_enabled_flag &&<br>!slice_ts_residual_coding_<br>disabled_flag ) | |
|   slice_dep_quant_<br>  enabled_flag | u(1) |
| if( sps_sign_data_hiding_<br>enabled_flag &&<br>!slice_dep_quant_enabled_<br>flag &&<br>!slice_ts_residual_coding_<br>disabled_flag ) | |
|   slice_sign_data_<br>  hiding_enabled_flag | u(1)<br></CHANGE> |
| if( ph_lmcs_enabled_flag ) | |
|   slice_lmcs_enabled_flag | u(1) |

| 7.3.7.1 General slice header syntax | |
|---|---|
| slice_header( ) { | Descriptor |
| if( ph_explicit_scaling_<br>list_enabled_flag ) | |
|   slice_explicit_scaling_<br>  list_used_flag | u(1) |
| if( NumEntryPoints > 0 ) { | |
|   offset_len_minus1 | ue(v) |
|   for( i = 0; i <<br>  NumEntryPoints; i++ ) | |
|     entry_point_offset_<br>    minus1[ i ] | u(v) |
| } | |
| if( slice_header_extension_<br>present_flag ) { | |
|   slice_header_<br>  extension_length | ue(v) |
|   for( i = 0; i < slice_header_<br>  extension_length; i++) | |
|     slice_header_extension_<br>    data_byte[ i ] | u(8) |
| } | |
| byte_alignment( ) | |
| } | |

7.4.3.7 Picture Header Structure Semantics

<DELETE> ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0. </DELETE>

7.4.8.1 General Slice Header Semantics slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is infered to be equal to 0.

<CHANGE> slice_dep_quant_enabled_flag equal to 0 specifies that dependent quantization is disabled for the current picture. slice_dep_quant_enabled_flag equal to 1 specifies that dependent quantization is enabled for the current picture. When slice_dep_quant_enabled_flag is not present, it is inferred to be equal to 0.

slice_sign_data_hiding_enabled_flag equal to 0 specifies that sign bit hiding is disabled for the current picture. slice_sign_data_hiding_enabled_flag equal to 1 specifies that sign bit hiding is enabled for the current picture. When slice_sign_data_hiding_enabled_flag is not present, it is inferred to be equal to 0. </CHANGE>

Example 2

In example 2, ph_dep_quant_enabled_flag and pic_sign_data_hiding_enabled_flag are moved from the picture header to the slice level, as in example 1. But in example 2, ph_dep_quant_enabled_flag and pic_sign_data_hiding_enabled_flag are placed before signaling of the slice_ts_residual_coding_disabled_flag. slice_ts_residual_coding_disabled_flag is constrained based on the slice_dep_quant_enabled_flag and slice_sign_data_hiding_enabled_flag. In this case, slice_ts_residual_coding_disabled_flag is not signaled but inferred to be 0 when any of slice_dep_quant_enabled_flag or slice_sign_data_hiding_enabled_flag are 1. For example, video encoder 200 may not signal slice_ts_residual_coding_disabled_flag when slice_dep_quant_enabled_flag or slice_sign_data_hiding_enabled_flag or both are 1 and video decoder 300 may infer slice_ts_residual_coding_disabled_flag to be 0 when slice_dep_quant_enabled_flag or slice_sign_data_hiding_enabled_flag or both are 1.

For example, video decoder 300 may receive a first slice header syntax element for a slice of the video data (e.g., slice_dep_quant_enabled_flag), determine a first value for the first slice header syntax element, wherein the first value is indicative of whether dependent quantization is enabled for the slice, receive a second slice header syntax element for the slice of the video data (e.g., slice_sign_data_hiding_enabled_flag), determine a second value for the second slice header syntax element, wherein the second value is indicative of whether sign data hiding is enabled for the slice, determine whether transform skip residual coding is disabled for the slice based on the first value and the second value, and decode the slice based on the determinations. For example, as part of determining whether transform skip residual coding is disabled for the slice, video decoder 300 may, in response to one or both of the first value indicating that dependent quantization is enabled for the slice or the second value indicating that sign data hiding is enabled for the slice, determine that transform skip residual coding is enabled for the slice. In such an example, video decoder 300 may infer that a third slice header syntax element indicative of whether transform skip residual coding is disabled for the slice (e.g., slice_ts_residual_coding_disabled_flag) is set to a value indicating that transform skip residual coding is enabled for the slice.

In some examples, as part of determining whether transform skip residual coding is disabled for the slice, video decoder 300 may, in response to the first value indicating that dependent quantization is disabled for the slice and the second value indicating that sign data hiding is disabled for the slice, receive a third slice header syntax element indicative of whether transform skip residual coding is disabled for the slice. In some examples, a third value for the third slice header syntax element indicates that transform skip residual coding is disabled for the slice, and wherein as part of decoding the slice, video decoder 300, in response to determining that a block of the slice is encoded in a transform skip mode, decodes the block using transform residual coding while refraining from using dependent quantization and sign data hiding on the block.

Example specification text changes to VVC Draft 8 are provided below. The beginning of the removal of syntax elements is shown with <DELETE> and the end of the removals are marked with </DELETE> and beginning of additions/modifications are shown with <CHANGE> and the end of additions/modifications are marked with </CHANGE>.

| 7.3.2.7 Picture header structure syntax | |
|---|---|
| picture_header_structure( ) { | Descriptor |
| ... | |
| <DELETE> if( sps_dep_ quant_enabled_flag ) | |

| 7.3.2.7 Picture header structure syntax | |
|---|---|
| picture_header_structure( ) { | Descriptor |
| ph_dep_quant_enabled_flag<br>if( sps_sign_data_hiding_<br>enabled_flag &&<br>!ph_dep_quant_enabled_flag )<br>  pic_sign_data_hiding_<br>  enabled_flag<br>...<br>} | u(1)<br><br><br><br>u(1)</DELETE> |

| 7.3.7.1 General slice header syntax | |
|---|---|
| slice_header( ) { | Descriptor |
| ...<br><DELETE> slice_ts_residual_<br>coding_disabled_flag<br><CHANGE>if( sps_dep_<br>quant_enabled_flag )<br>  slice_dep_quant_enabled_flag<br>  if( sps_sign_data_hiding_<br>  enabled_flag &&<br>!slice_dep_quant_enabled_flag )<br>  slice_sign_data_hiding_<br>  enabled_flag<br>  if( !slice_sign_data_hiding_<br>  enabled_flag &&<br>!slice_dep_quant_enabled_flag )<br>  slice_ts_residual_<br>coding_disabled_flag<br>if( ph_lmcs_enabled_flag )<br>  slice_lmcs_enabled_flag<br>if( ph_explicit_scaling_<br>list_enabled_flag )<br>  slice_explicit_scaling_<br>  list_used_flag<br>if( NumEntryPoints > 0 ) {<br>  offset_len_minus1<br>  for( i = 0; i <<br>  NumEntryPoints; i++ )<br>    entry_point_offset_minus1[ i ]<br>}<br>if( slice_header_extension_<br>present_flag ) {<br>  slice_header_extension_length<br>  for( i = 0; i < slice_header_<br>  extension_length; i++)<br>    slice_header_extension_<br>    data_byte[ i ]<br>}<br>byte_alignment( )<br>} | <br>u(1)<br></DELETE><br><br><br><br>u(1)<br><br><br><br><br>u(1)<br><br><br><br>u(1)<br></CHANGE><br><br>u(1)<br><br><br>u(1)<br><br>ue(v)<br><br><br>u(v)<br><br><br><br>ue(v)<br><br><br>u(8)<br> |

Example 3

In example 3, the ph_dep_quant_enabled_flag and pic_sign_data_hiding_enabled_flag are kept in the picture header. However, the signaling of slice_ts_residual_coding_disabled_flag is conditioned based on the former two flags, ph_dep_quant_enabled_flag and pic_sign_data_hiding_enabled_flag. For example, video encoder 200 may not signal slice_ts_residual_coding_disabled_flag based upon the value of ph_dep_quant_enabled_flag and pic_sign_data_hiding_enabled_flag. Video decoder 300 may infer the value of slice_ts_residual_coding_disabled_flag based upon the value of ph_dep_quant_enabled_flag and pic_sign_data_hiding_enabled_flag.

Example specification text changes to VVC Draft 8 are provided below. The beginning of additions/modifications are shown with <CHANGE> and the end of additions/modifications are marked with </CHANGE>.

| 7.3.7.1 General slice header syntax | |
|---|---|
| slice_header( ) { | Descriptor |
| ... | |
| <CHANGE> if( !ph_dep_ quant_enabled_flag && !pic_sign_data_hiding_enabled_ flag ) </CHANGE> | |
|   slice_ts_residual_coding_ disabled_flag | u(1) |
|   if( ph_lmcs_enabled_flag ) | |
|     slice_lmcs_enabled_flag | u(1) |
|   if( ph_explicit_scaling_ list_enabled_flag ) | |
|     slice_explicit_scaling_ list_used_flag | u(1) |
|   if( NumEntryPoints > 0 ) { | |
|     offset_len_minus1 | ue(v) |
|     for( i = 0; i < NumEntryPoints; i++ ) | |
|       entry_point_offset_ minus1[ i ] | u(v) |
|   } | |
|   if( slice_header_extension_ present_flag ) { | |
|     slice_header_extension_length | ue(v) |
|     for( i = 0; i < slice_header_ extension_length; i++) | |
|       slice_header_extension_ data_byte[ i ] | u(8) |
|   } | |
|   byte_alignment( ) | |
| } | |

Example 4

In example 4, the use of DQ and SDH are implicitly disabled in residual_coding( ) based on the slice level flag slice_ts_residual_coding_disabled_flag. For example, video encoder 200 and video decoder 300 may not use DQ or SDH based on slice_ts_residual_coding_disabled_flag. The beginning of additions/modifications to VVC Draft 8 are shown with <CHANGE> and the end of additions/modifications are marked with </CHANGE>.

| 7.3.10.11 Residual coding syntax | |
|---|---|
| residual_coding( x0, y0, log2TbWidth, log2TbHeight, cIdx ) { | Descriptor |
|   QState = 0 | |
|   ... | |
|   for( n = firstPosMode0; n >= 0 && remBinsPass1 >= 4; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) && ( xC != LastSignificantCoeffX \|\| yC != Last SignificantCoeffY ) ) { | |
|       sig_coeff_flag[ xC ][ yC ] | ae(v) |
|       remBinsPass1- - | |
|       if( sig_coeff_flag[ xC ][ yC ] ) | |

-continued

| 7.3.10.11 Residual coding syntax | |
|---|---|
| residual_coding( x0, y0, log2TbWidth, log2TbHeight, cIdx ) { | Descriptor |
|         inferSbDcSigCoeffFlag = 0 | |
|     } | |
|     if( sig_coeff_flag[ xC ][ yC ] ) { | |
|       abs_level_gtx_flag[ n ][ 0 ] | ae(v) |
|       remBinsPass1- - | |
|       if( abs_level_gtx_flag[ n ][ 0 ] ) { | |
|         par_level_flag[ n ] | ae(v) |
|         remBinsPass1- - | |
|         abs_level_gtx_flag[ n ][ 1 ] | ae(v) |
|         remBinsPass1- - | |
|       } | |
|       if( lastSigScanPosSb = = -1 ) | |
|         lastSigScanPosSb = n | |
|         firstSigScanPosSb = n | |
|     } | |
|     AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_ flag[ n ][ 1 ] | |
|     if( ph_dep_quant_enabled_ flag <CHANGE> && !slice_ts_residual_coding_ disabled_flag </CHANGE>) | |
|       QState = QStateTransTable [ QState ][ AbsLevelPass1 [ xC ][ yC ] & 1 ] | |
|     firstPosMode1 = n - 1 | |
|   } | |
|   for( n = firstPosMode0; n > firstPosMode1; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( abs_level_gtx_flag[ n ][ 1 ] ) | |
|       abs_remainder[ n ] | ae(v) |
|     AbsLevel[ xC ][ yC ] = AbsLevelPass1[ xC ][ yC ] + 2 * abs_remainder[ n ] | |
|   } | |
|   for( n = firstPosMode1; n >= 0; n- - ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_ flag[ xS ][ yS ] ) | |
|       dec_abs_level[ n ] | ae(v) |
|     if( AbsLevel[ xC ][ yC ] > 0 ) { | |
|       if( lastSigScanPosSb = = -1 ) | |
|         lastSigScanPosSb = n | |
|         firstSigScanPosSb = n | |
|     } | |
|     if( ph_dep_quant_enabled_ flag <CHANGE> && !slice_ts_residual_coding_ disabled_flag </CHANGE> ) | |
|       QState = QStateTransTable [ QState ][ AbsLevel [ xC ][ yC ] & 1 ] | |
|   } | |
|   if( ph_dep_quant_enabled_flag \|\| !pic_sign_data_hiding_enabled_flag <CHANGE> +\|\| slice_ts_residual_coding_ disabled_flag </CHANGE> ) | |
|     signHidden = 0 | |

7.3.10.11 Residual coding syntax

```
residual_coding( x0, y0, log2TbWidth,
log2TbHeight, cIdx ) {                    Descriptor
  else
    signHidden = ( lastSigScanPosSb -
    firstSigScanPosSb > 3 ? 1 : 0 )
    for( n = numSbCoeff - 1;
    n >= 0; n- - ) {
      xC = ( xS << log2SbW ) +
DiagScanOrder[ log2SbW ]
[ log2SbH ][ n ][ 0 ]
      yC = ( yS << log2SbH ) +
DiagScanOrder[ log2SbW ]
[ log2SbH ][ n ][ 1 ]
      if( ( AbsLevel[ xC ][ yC ] > 0 ) &&
      ( !signHidden | | ( n !=
      firstSigScanPosSb ) ) )
        coeff_sign_flag[ n ]            ae(v)
    }
  }
  if( ph_dep_quant_enabled_flag
<CHANGE>&&
!slice_ts_residual_coding_
disabled_flag</CHANGE> ) {
    QState = startQStateSb
    for( n = numSbCoeff - 1;
    n >= 0; n- - ) {
      xC = ( xS << log2SbW ) +
DiagScanOrder[ log2SbW ]
[ log2SbH ][ n ][ 0 ]
      yC = ( yS << log2SbH ) +
DiagScanOrder[ log2SbW ]
[ log2SbH ][ n ][ 1 ]
      if( AbsLevel[ xC ][ yC ] > 0 )
        TransCoeffLevel[ x0 ][ y0 ]
        [ cIdx ][ xC ][ yC ] =
          ( 2 * AbsLevel[ xC ][ yC ] -
          ( QState > 1 ? 1 : 0 ) ) *
          ( 1 - 2 * coeff_sign_flag[ n ] )
      +
      QState = QStateTransTable
      [ QState ][ AbsLevel[ xC ]
      [ yC ] & 1 ]
    } else {
      sumAbsLevel = 0
      for( n = numSbCoeff - 1;
      n >= 0; n- - ) {
        xC = ( xS << log2SbW ) +
DiagScanOrder[ log2SbW ]
[ log2SbH ][ n ][ 0 ]
        yC = ( yS << log2SbH ) +
DiagScanOrder[ log2SbW ]
[ log2SbH ][ n ][ 1 ]
        if( AbsLevel[ xC ][ yC ] > 0 ) {
          TransCoeffLevel[ x0 ][ y0 ]
          [ cIdx ][ xC ][ yC ] =
            AbsLevel[ xC ][ yC ] * ( 1 -
            2 * coeff_sign_flag[ n ] )
          if( signHidden ) {
            sumAbsLevel +=
            AbsLevel[ xC ][ yC ]
            if( ( n = = firstSigScanPosSb )
            && ( sumAbsLevel %
            2 ) = = 1 ) )
              TransCoeffLevel[ x0 ][ y0 ]
              [ cIdx ][ xC ][ yC ] =
                -TransCoeffLevel[ x0 ]
                [ y0 ][ cIdx ][ xC ][ yC ]
          }
        }
      }
    }
  }
}
...
```

In all four examples, the use of dependent quantization and sign data hiding methods for transform skipped blocks that use TRC for coding of residuals are disabled.

Example 5

Building on example 2 above, the optional signaling of ph_dep_quant_info_in_ph_flag and ph_sign_data_hiding_info_in_ph_flag in PPS indicating the presence of DQ and SDH information may be added in the picture header (PH) syntax structure. If video encoder 200 signals DQ or SDH in the PH, then video encoder 200 may not signal slice level slice_dep_quant_enabled_flag and/or slice_sign_data_hiding_enabled_flag, and video decoder 300 may infer their values to be equal to the values signaled in the picture header. If this flag information is not signaled in the PH, then the information may be signaled in the slice header as in Example 2. The presence of slice_residual_coding_disabled_flag may be conditioned on TS enabling at SPS level (e.g., the support for TS), and the support for signaling of slice level switching between TSRC and TRC for TS blocks through slice_residual_coding_disabled_flag in addition to Example 2. The support for signaling of slice level switching of between TSRC and TRC can be controlled by a flag in PPS or SPS level flag. APPS level flag, . . . pps_ts_residual_coding_override_flag, or SPS level sps_ts_residual_coding_override_flag can be used to gate the presence of slice_residual_coding_disabled_flag as shown in spec text below.

In the case where video encoder 200 does not signal ph_dep_quant_enabled_flag and pic_sign_data_hiding_enabled_flag in a PH, conditioning of slice level slice_dep_quant_enabled_flag and slice_sign_data_hiding_enabled_flag on PH level ph_dep_quant_enabled_flag and pic_sign_data_hiding_enabled_flag may be omitted as well as signaling of their presence in the PPS. With this technique, a hierarchical signaling of DQ and SDH flags at the picture level and the slice level may be achieved.

Additions and modifications are shown below related to VVC Draft Text 8 (with changes shown within the <CHANGE> and </CHANGE> tags).

7.3.2.3 Sequence parameter set RBSP syntax

| seq_parameter_set_rbsp( ) { | Descriptor |
|---|---|
| sps_seq_parameter_set_id | u(4) |
| sps_video_parameter_set_id | u(4) |
| .... | |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| <CHANGE> sps_residual_coding_override_present_flag | u(1) </CHANGE> |
| } | |
| sps_ref_wraparound_enabled_flag | u(1) |
| sps_temporal_mvp_enabled_flag | u(1) |
| if( sps_temporal_mvp_enabled_flag ) | |

7.3.2.4 Picture parameter set RBSP syntax

| pic_parameter_set_rbsp( ) { | Descriptor |
|---|---|
| pps_pic_parameter_set_id | ue(v) |
| .... | |
| cabac_init_present_flag | u(1) |

7.3.2.4 Picture parameter set RBSP syntax

| pic_parameter_set_rbsp( ) { | Descriptor |
|---|---|
| <CHANGE>pps_residual_<br>coding_override_present_flag<br>... | u(1)<br></CHANGE> |

7.3.2.4 Picture parameter set RBSP syntax

| pic_parameter_set_rbsp( ) { | Descriptor |
|---|---|
| pps_pic_parameter_set_id | ue(v) |
| pps_seq_parameter_set_id | u(4) |
| ..... | |
|   loop_filter_across_<br>  tiles_enabled_flag | u(1) |
|   loop_filter_across_<br>  slices_enabled_flag<br>} | u(1) |
| <CHANGE><br>if( sps_dep_quant_enabled_flag)<br>  dep_quant_info_in_ph_flag<br>if( sps_sign_data_<br>hiding_enabled_flag)<br>  sign_data_hiding_<br>  info_in_ph_flag<br>cabac_init_present_flag<br>.... | <br><br>u(1)<br><br><br>u(1)<br></CHANGE><br>u(1) |

7.3.2.7 Picture header structure syntax

| picture_header_structure( ) { | Descriptor |
|---|---|
| gdr_or_irap_pic_flag | u(1) |
| if( gdr_or_irap_pic_flag ) | |
|   gdr_pic_flag | u(1) |
| ph_inter_slice_allowed_flag | u(1) |
| ..... | u(1) |
|   if( ChromaArrayType != 0 ) | |
|     ph_sao_chroma_enabled_flag<br>} | u(1) |
| if( sps_dep_quant_enabled_<br>flag <CHANGE>&&<br>dep_quant_info_in_ph_flag )<br></CHANGE><br>  ph_dep_quant_enabled_flag<br>if( sps_sign_data_hiding_<br>enabled_flag <CHANGE>&&<br>sign_data_hiding_info_in_ph_flag<br></CHANGE> &&<br>  !ph_dep_quant_enabled_flag )<br>  pic_sign_data_hiding_enabled_flag<br>if( deblocking_filter_<br>override_enabled_flag<br>&& dbf_info_in_ph_flag )<br>{<br>... | <br><br><br><br>u(1)<br><br><br><br><br><br>u(1) |

In some examples, this subclause may be moved to be somewhere after the subclause of the RBSP trailing bits syntax.

7.3.7.1 General slice header syntax

| slice_header( ) { | Descriptor |
|---|---|
| picture_header_in_<br>slice_header_flag<br>.... | u(1) |

7.3.7.1 General slice header syntax

| slice_header( ) { | Descriptor |
|---|---|
| slice_deblocking_filter_<br>disabled_flag<br>if( !slice_deblocking_<br>filter_disabled_flag ) { | u(1) |
|   slice_beta_offset_div2 | se(v) |
|   slice_tc_offset_div2 | se(v) |
|   slice_cb_beta_offset_div2 | se(v) |
|   slice_cb_tc_offset_div2 | se(v) |
|   slice_cr_beta_offset_div2 | se(v) |
|   slice_cr_tc_offset_div2<br>}<br>}<br><CHANGE><br>if( sps_dep_quant_enabled_flag &&<br>!dep_quant_info_in_ph_flag ) | se(v) |
|   slice_dep_quant_enabled_flag | u(1) |
| if( sps_sign_data_hiding_<br>enabled_flag &&<br>!sign_data_hiding_info_<br>in_ph_flag &&<br>!slice_dep_quant_enabled_flag )<br>  slice_sign_data_hiding_<br>  enabled_flag | <br><br><br><br><br>u(1) |
| if( sps_transform_skip_<br>enabled_flag &&<br>pps_ts_residual_coding_<br>override_flag &&<br>!slice_dep_quant_<br>enabled_flag &&<br>!slice_sign_data_hiding_<br>enabled_flag )<br></CHANGE> | |
|   slice_ts_residual_<br>  coding_disabled_flag | u(1) |
| if( ph_lmcs_enabled_flag )<br>  slice_lmcs_enabled_flag<br>.... | u(1) |
| Or | |
| picture_header_in_<br>slice_header_flag<br>.... | u(1) |
|   slice_deblocking_filter_<br>  disabled_flag<br>  if( !slice_deblocking_filter_<br>  disabled_flag ) { | u(1) |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2<br>  }<br>}<br><CHANGE><br>if( sps_dep_quant_enabled_flag &&<br>!dep_quant_info_in_ph_flag ) | se(v) |
|   slice_dep_quant_enabled_flag | u(1) |
| if( sps_sign_data_hiding_<br>enabled_flag &&<br>!sign_data_hiding_info_<br>in_ph_flag &&<br>!slice_dep_quant_enabled_flag )<br>  slice_sign_data_hiding_<br>  enabled_flag | <br><br><br><br><br>u(1) |
| if( sps_transform_skip_<br>enabled_flag &&<br>sps_ts_residual_coding_<br>override_flag &&<br>!slice_dep_quant_<br>enabled_flag &&<br>!slice_sign_data_hiding_<br>enabled_flag )<br></CHANGE> | |
|   slice_ts_residual_coding_<br>  disabled_flag | u(1) |

```
           7.3.7.1 General slice header syntax slice_header( ) {                             Descriptor if( ph_lmcs_enabled_flag )
   slice_lmcs_enabled_flag                    u(1)
....
```

<CHANGE>
sps_residual_coding_override_present_flag equal to 1 specifies that ts_residual_coding_disabled_flag is present in slice headers referring to the SPS. ts_residual_coding_override_present_flag equal to 0 specifies that ts_residual_coding_disabled_flag is not present in slice headers referring to the SPS. Default value of sps_residual_coding_override_present_flag is equal to 0 when not present.
</CHANGE>

In other examples, the changes may be as follows:
<CHANGE>
pps_residual_coding_override_present_flag equal to 1 specifies that ts_residual_coding_disabled_flag is present in slice headers referring to the PPS. ts_residual_coding_override_present_flag equal to 0 specifies that ts_residual_coding_disabled_flag is not present in slice headers referring to the PPS. Default value of pps_residual_coding_override_present_flag is equal to 0 when not present.

dep_quant_info_in_ph_flag equal to 1 specifies that dependent quantization information is present in the PH syntax structure and not present in slice headers referring to the PPS that do not contain a PH syntax structure. dep_quant_info_in_ph_flag equal to 0 specifies that dependent quantization information is not present in the PH syntax structure and may be present in slice headers referring to the PPS that do not contain a PH syntax structure. sign_data_hiding_info_in_ph_flag equal to 1 specifies that sign data hiding information is present in the PH syntax structure and not present in slice headers referring to the PPS that do not contain a PH syntax structure. sign_data_hiding_info_in_ph_flag equal to 0 specifies that sign data hiding information is not present in the PH syntax structure and may be present in slice headers referring to the PPS that do not contain a PH syntax structure.
</CHANGE>

In other examples, the changes may be as follows:
sps_residual_coding_override_present_flag equal to 1 specifies that slice_ts_residual_coding_disabled_flag is present in slice headers referring to the SPS. sps_residual_coding_override_present_flag equal to 0 specifies that ts_residual_coding_disabled_flag is not present in slice headers referring to the SPS. Default value of sps_residual_coding_override_present_flag is equal to 0 when not present.
</CHANGE>

In other examples, the changes may be as follows:
<CHANGE>
pps_residual_coding_override_present_flag equal to 1 specifies that ts_residual_coding_disabled_flag is present in slice headers referring to the PPS. pps_residual_coding_override_present_flag equal to 0 specifies that slice_ts_residual_coding_disabled_flag is not present in slice headers referring to the PPS. Default value of pps_residual_coding_override_present_flag is equal to 0 when not present.

dep_quant_info_in_ph_flag equal to 1 specifies that dependent quantization information is present in the PH syntax structure and not present in slice headers referring to the PPS that do not contain a PH syntax structure. dep_quant_info_in_ph_flag equal to 0 specifies that dependent quantization information is not present in the PH syntax structure and may be present in slice headers referring to the PPS that do not contain a PH syntax structure.

sign_data_hiding_info_in_ph_flag equal to 1 specifies that sign data hiding information is present in the PH syntax structure and not present in slice headers referring to the PPS that do not contain a PH syntax structure.

sign_data_hinding_info_in_ph_flag equal to 0 specifies that sign data hiding information is not present in the PH syntax structure and may be present in slice headers referring to the PPS that do not contain a PH syntax structure.
</CHANGE>

Another example will now be described. If video encoder 200 does not signal DQ and SDH in the PH, then the specification can be simplified to for cases where enabling of signaling of residual coding method is either in the PPS or the SPS.

```
           7.3.7.1 General slice header syntax slice_header( ) {                                   Descriptor picture_header_in_slice_                           u(1)
 header_flag
....
   slice_deblocking_filter_                         u(1)
   disabled_flag
   if( !slice_deblocking_filter_
   disabled_flag ) {
     slice_beta_offset_div2                         se(v)
     slice_tc_offset_div2                           se(v)
     slice_cb_beta_offset_div2                      se(v)
     slice_cb_tc_offset_div2                        se(v)
     slice_cr_beta_offset_div2                      se(v)
     slice_cr_tc_offset_div2                        se(v)
   }
 }
<CHANGE>
if( sps_dep_quant_enabled_flag )
   slice_dep_quant_enabled_flag                    u(1)
 if( sps_sign_data_hiding_
 enabled_flag &&
 !slice_dep_quant_enabled_flag )
   slice_sign_data_hiding_enabled_flag             u(1)
 if( sps_transform_skip_enabled_flag &&
 pps_ts_residual_coding_override_flag &&
 !slice_dep_quant_enabled_flag &&
 !slice_sign_data_hiding_enabled_flag )
</CHANGE>
   slice_ts_residual_                              u(1)
   coding_disabled_flag
 if( ph_lmcs_enabled_flag )
   slice_lmcs_enabled_flag                         u(1)
....
or
 picture_header_in_                                u(1)
 slice_header_flag
....
   slice_deblocking_                               u(1)
   filter_disabled_flag
   if( !slice_deblocking_
   filter_disabled_flag ) {
     slice_beta_offset_div2                        se(v)
     slice_tc_offset_div2                          se(v)
     slice_cb_beta_offset_div2                     se(v)
     slice_cb_tc_offset_div2                       se(v)
```

```
            7.3.7.1 General slice header syntax slice_cr_beta_offset_div2              se(v)
    slice_cr_tc_offset_div2                se(v)
  }
}
<CHANGE>
if( sps_dep_quant_enabled_flag )
  slice_dep_quant_enabled_flag             u(1)
  if( sps_sign_data_hiding_
enabled_flag &&
!slice_dep_quant_enabled_flag )
  slice_sign_data_hiding_enabled_flag      u(1)
  if( sps_transform_skip_enabled_flag &&
sps_ts_residual_coding_override_flag &&
  !slice_dep_quant_enabled_flag &&
  !slice_sign_data_hiding_enabled_flag )
</CHANGE>
  slice_ts_residual_coding_disabled_flag   u(1)
  if( ph_lmcs_enabled_flag )
    slice_lmcs_enabled_flag                u(1)
....
```

Figure 5:
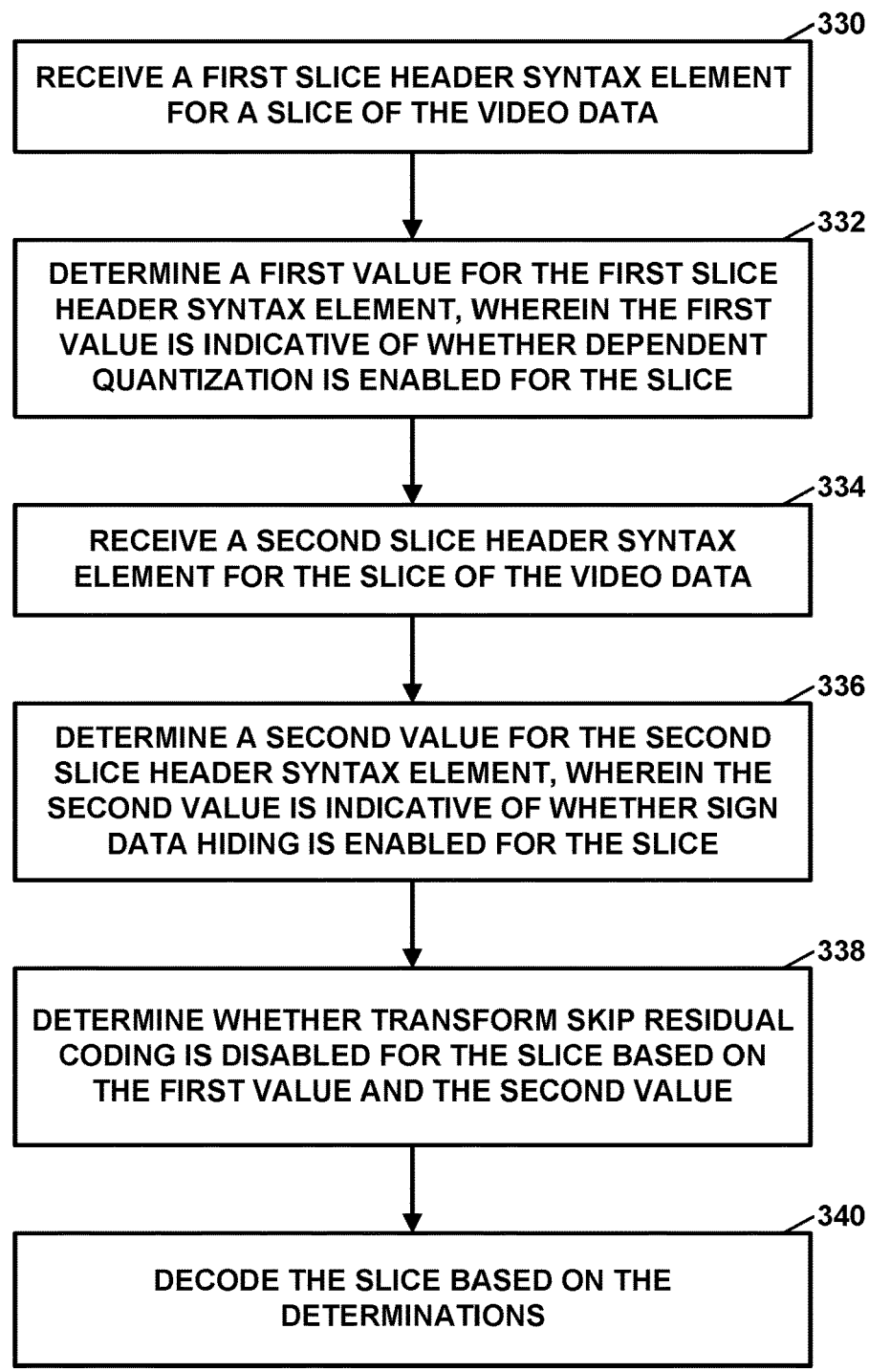
FIG. 5 is a flowchart illustrating techniques of preventing the use of dependent quantization and sign data hiding for transform skip blocks using transform residual coding according to the techniques of this disclosure.

FIG. 5 is a flowchart illustrating techniques of preventing the use of dependent quantization and sign data hiding for transform skip blocks using transform residual coding according to the techniques of this disclosure. Video decoder 300 may receive a first slice header syntax element for a slice of the video data (330). For example, video decoder 300 may receive, in a bit stream, a slice of video data having a header that includes a slice_dep_quant_enabled_flag. Video decoder 300 may determine a first value for the first slice header syntax element, wherein the first value is indicative of whether dependent quantization is enabled for the slice (332). For example, video decoder 300 may parse a syntax element in a slice header, such as slice_dep_quant_enabled_flag, indicative of whether dependent quantization is enabled for the slice. Video decoder 300 may receive a second slide header syntax element for the slice of the video data (334). For example, video decoder 300 may receive, in the bit stream, the slice of video data having a header that includes a slice_sign_data_hiding_enabled_flag. Video decoder 300 may determine a second value for the second slice header syntax element of the slice indicative of whether sign data hiding is enabled for the slice (336). For example, video decoder 300 may parse a syntax element in the slice header, such as slice_sign_data_hiding_enabled_flag indicative of whether sign data hiding is enabled for the slice.

Video decoder 300 may determine whether transform skip residual coding is disabled for the slice based on the first value and the second value (338). For example, as part of determining whether transform skip residual coding is disabled for the slice, video decoder 300 may, in response to one or both of the first value indicating that dependent quantization is enabled for the slice (e.g., the first value is equal to 1) or the second value indicating that sign data hiding is enabled for the slice (e.g., the second value is equal to 1), determine that transform skip residual coding is enabled for the slice. In such an example, video decoder 300 may infer that a third slice header syntax element indicative of whether transform skip residual coding is disabled for the slice (e.g., slice_ts_residual_coding_disabled_flag) is set to a value indicating that transform skip residual coding is enabled for the slice (e.g., is the value is equal to 0). In some examples, in response to determining that a block of the slice is encoded in a transform skip mode, video decoder 300 may apply transform skip residual decoding to the block. In some examples, the first value is equal to 1 or the second value is equal to 1.

In some examples, as part of determining whether transform skip residual coding is disabled for the slice, video decoder 300 may, in response to the first value indicating that dependent quantization is disabled for the slice and the second value indicating that sign data hiding is disabled for the slice, receive a third slice header syntax element indicative of whether transform skip residual coding is disabled for the slice (e.g., slice_ts_residual_coding_disabled_flag). In some examples, a third value for the third slice header syntax element indicates that transform skip residual coding is disabled for the slice (e.g., the third value equals 1), and wherein as part of decoding the slice, video decoder 300, in response to determining that a block of the slice is encoded in a transform skip mode, decodes the block using transform residual coding while refraining from using dependent quantization and sign data hiding on the block. In some examples, a third value for the third slice header syntax element indicates that transform skip residual coding is enabled for the slice, and wherein as part of decoding the slice, video decoder 300 may, in response to determining that a block of the slice is encoded in a transform skip mode, applying transform skip residual decoding to the block.

In some examples, the first value is equal to 0 (e.g., the value of slice_dep_quant_enabled_flag is equal to 0) and the second value is equal to 0 (e.g., the value of slice_sign_data_hiding_enabled_flag is equal to 0). For example, as part of determining whether transform skip residual coding is disabled for the slice, video decoder 300 may, in response to the first value indicating that dependent quantization is disabled for the slice and the second value indicating that sign data hiding is disabled for the slice, receive a third slice header syntax element indicative of whether transform skip residual coding is disabled for the slice. In some examples, a third value for the third slice header syntax element indicates that transform skip residual coding is disabled for the slice, and wherein as part of decoding the slice, video decoder 300, in response to determining that a block of the slice is encoded in a transform skip mode, decodes the block using transform residual coding while refraining from using dependent quantization and sign data hiding on the block.

In such examples, video decoder 300 may determine whether transform skip residual coding is disabled for the slice at least in part by parsing a syntax element in the slice header. For example, video decoder 300 may parse slice_ts_residual_coding_disabled_flag when determining whether transform skip residual coding is disabled for the slice.

Video decoder 300 may decode the slice based on the determinations (340). For example, video decoder 300 may decode the slice based on the first value, the second value, and the determination of whether transform skip residual coding is disabled. For example, video decoder 300 may not apply transform skip residual coding if dependent quantization is enabled, if sign data hiding is enabled, or if both dependent quantization and sign data hiding is enabled.

In some examples, where at least one of the first value or the second value is 1, video decoder 300 may refrain from parsing, in the slice header and based on at least one of the first value or the second value being 1, a syntax element indicative of whether transform skip residual coding is disabled for the slice. For example, video encoder 200 may not signal the syntax element indicative of whether transform skip residual coding is disabled for the slice (e.g., slice_ts_residual_coding_disabled_flag) and video decoder 300 may infer the value of the syntax element indicative of whether transform skip residual coding is disabled for the slice to be indicative of transform skip residual coding not being disabled (e.g., being enabled).

In some examples, when decoding the slice, video decoder 300 may apply transform skip residual coding to the slice. In some examples, when decoding the slice, video decoder 300 may refrain from applying transform residual decoding to the slice. In some examples, the first value being equal to 1 is indicative of dependent quantization being enabled for the slice, and the second value being equal to 1 is indicative of sign data hiding being enabled for the slice. In some examples, the slice includes a block, and the block is encoded using transform skip mode. In such examples, as part of decoding the slice, video decoder 300 may decode the block using transform residual coding while refraining from using dependent quantization and sign data hiding on the block.

In some examples, a device includes a display configured to display the slice. In some examples, a device is a mobile device.

Figure 6:
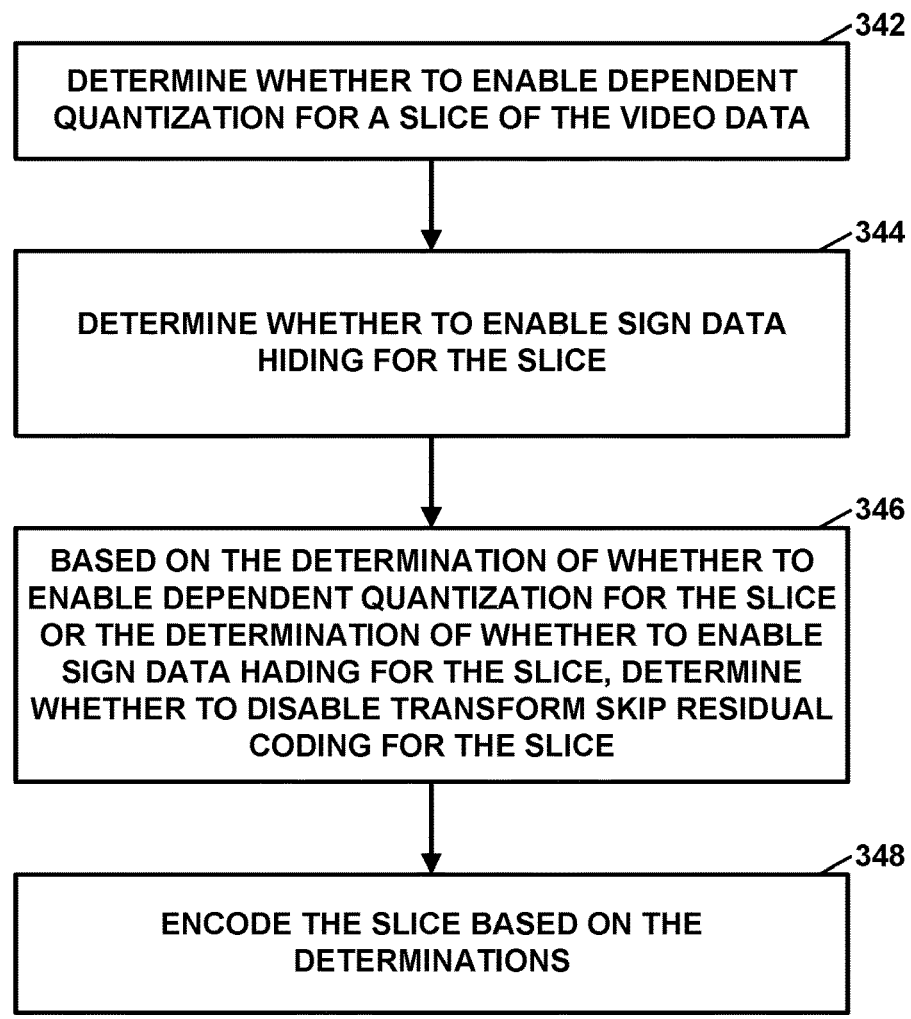
FIG. 6 is a flowchart illustrating other techniques of preventing the use of dependent quantization and sign data hiding for transform skip blocks using transform residual coding according to the techniques of this disclosure.

FIG. 6 is a flowchart illustrating other techniques of preventing the use of dependent quantization and sign data hiding for transform skip blocks using transform residual coding according to the techniques of this disclosure. Video encoder 200 may determine whether to enable dependent quantization for a slice of the video data (342). For example, video encoder 200 may coordinate multiple encoding passes to test combinations of encoding parameters and resulting rate-distortion values for such combinations when determining whether to enable dependent quantization for the slice.

Video encoder 200 may determine whether to enable sign data hiding for the slice (344). For example, video encoder 200 may coordinate multiple encoding passes to test combinations of encoding parameters and resulting rate-distortion values for such combinations when determining whether to enable sign data hiding for the slice.

Based on the determination of whether to enable dependent quantization for the slice or the determination of whether to enable sign data hiding for the slice, video encoder 200 may determine whether to disable transform skip residual coding for the slice (346). For example, if either or both of dependent quantization or sign data hiding are enabled, video encoder 200 may enable transform skip residual coding for the slice. Video encoder 200 may encode the slice based on the determinations (348). For example, if either or both of dependent quantization or sign data hiding are enabled, video encoder 200 may encode the slice using transform skip residual coding.

determining whether to disable transform skip residual coding for the slice comprises in response to one or both determining that dependent quantization is enabled for the slice or determining that sign data hiding is enabled for the slice, determining that transform skip residual coding is enabled for the slice.

In some examples, video encoder 200 may refrain from signaling a third slice header syntax element indicative of whether transform skip residual coding is disabled for the slice. In some examples, video encoder 200 may, in response to determining to encode a block of the slice in a transform skip mode, apply transform skip residual decoding to the block.

In some examples, video encoder 200 may signal a first slice header syntax element for the slice, wherein the first syntax element is indicative of whether dependent quantization is enabled for the slice. In some examples, video encoder 200 may signal a second slice header syntax element for the slice, wherein the second value is indicative of whether sign data hiding is enabled for the slice, and wherein the first value is equal to 1 or the second value is equal to 1.

In some examples, in response to determining to disable dependent quantization for the slice and determining to disable sign data hiding is disabled for the slice, video encoder 200 may signal a third slice header syntax element indicative of whether transform skip residual coding is disabled for the slice. In some examples, a third value for the third slice header syntax element indicates that transform skip residual coding is disabled for the slice, and video encoder 200 may in response to determining to encode a block of the slice is encoded in a transform skip mode, refraining from using dependent quantization and sign data hiding on the block. In some examples, video encoder 200 may, in response to determining to encode a block of the slice in a transform skip mode, apply transform skip residual encoding to the block.

Figure 7:
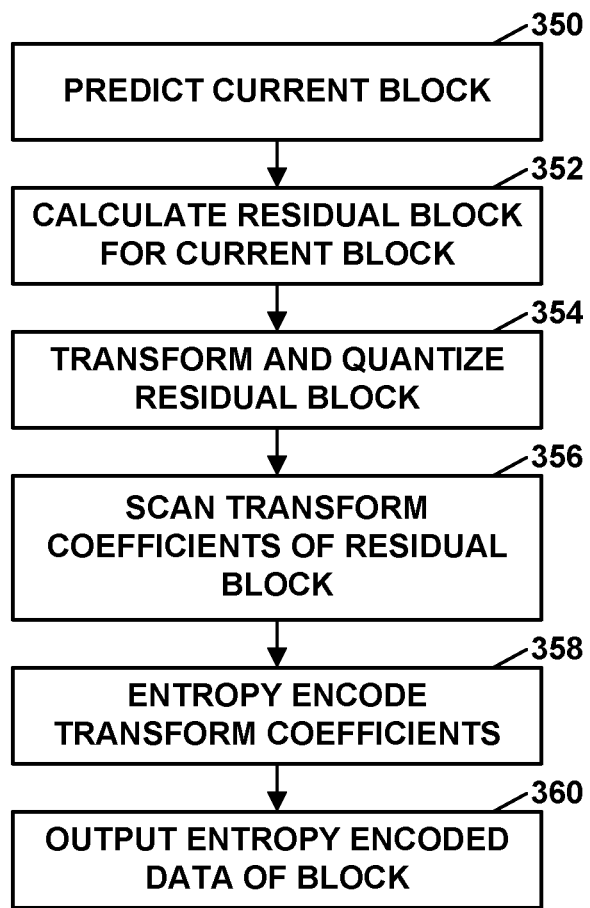
FIG. 7 is a flowchart illustrating example techniques for video encoding.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). For example, video encoder 200 may determine first value of a first slice header syntax element of a slice of the video data indicative of whether dependent quantization is enabled for the slice, determine a second value of a second slice header syntax element of the slice indicative of whether sign data hiding is enabled for the slice and determine whether transform skip residual coding is disabled for the slice. In some examples, as explained above, the transform process may be skipped. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
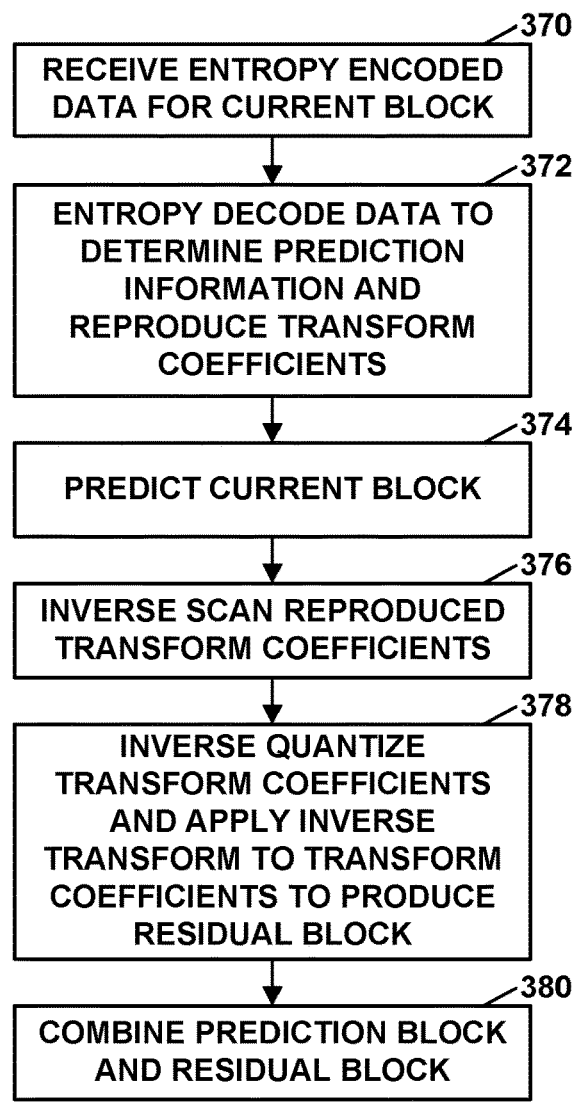
FIG. 8 is a flowchart illustrating example techniques for video decoding.

FIG. 8 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). For example, video decoder 300 may determine first value of a first slice header syntax element of a slice of the video data indicative of whether dependent quantization is enabled for the slice, determine a second value of a second slice header syntax element of the slice indicative of whether sign data hiding is enabled for the slice, and determine whether transform skip residual coding is disabled for the slice. In some examples, as explained above, the transform process may be skipped. Video decoder 300 may ultimately decode the current block by combining the prediction block and the residual block (380). In some examples, the decoding may be based on the determinations of the first value, the second value, and whether transform skip residual coding is disabled.

By disallowing the use of lossy coding tools, such as DQ and SDH, when transform skip residual coding is enabled, through the techniques of this disclosure, otherwise lossless coding may be prevented from becoming lossy.

This disclosure includes the following examples.

Clause 1A. A method of coding video data, the method comprising: determining a block of the video data is a transform skip block; coding the transform skip block using transform residual coding; and refraining from using dependent quantization and sign data hiding.

Clause 2A. The method of clause 1A, further comprising: determining whether slice_ts_residual_coding_disabled_flag is equal to 1; and based on slice_ts_residual_coding_disabled_flag being equal to 1, refraining from signaling ph_dep_quant_enabled_flag and pic_sign_data_hiding_enabled_flag or inferring ph_dep_quant_enabled_flag and pic_sign_data_hiding_enabled_flag to both equal 0.

Clause 3A. The method of clause 1A, further comprising: determining whether either slice_dep_quant_enabled_flag or slice_sign_data_hiding_enabled_flag or both slice_dep_quant_enabled_flag and slice_sign_data_hiding_enabled_flag are equal to 1; and based on either slice_dep_quant_enabled_flag or slice_sign_data_hiding_enabled_flag or both slice_dep_quant_enabled_flag and slice_sign_data_hiding_enabled_flag being equal to 1, refraining from signaling slice_ts_residual_coding_disabled_flag or inferring slice_ts_residual_coding_disabled_flag to be 0.

Clause 4A. The method of clause 1A, further comprising: determining a value for ph_dep_quant_enabled_flag and pic_sign_data_hiding_enabled_flag; and based on the value of ph_dep_quant_enabled_flag and pic_sign_data_hiding_enabled_flag, refraining from signaling slice_ts_residual_coding_disabled_flag or inferring a value of slice_ts_residual_coding_disabled_flag.

Clause 5A. The method of clause 1A, further comprising: determining a value of slice_ts_residual_coding_disabled_flag; and based on the value of slice_ts_residual_coding_disabled_flag; refraining from using dependent quantization and sign data hiding.

Clause 6A. The method of any of clauses 1A-5A, wherein coding comprises decoding.

Clause 7A. The method of any of clauses 1A-6A, wherein coding comprises encoding.

Clause 8A. A device for coding video data, the device comprising one or more means for performing the method of any of clauses 1A-7A.

Clause 9A. The device of clause 8A, wherein the one or more means comprise one or more processors implemented in circuitry.

Clause 10A. The device of any of clauses 8A and 9A, further comprising a memory to store the video data.

Clause 11A. The device of any of clauses 8A-10A, further comprising a display configured to display decoded video data.

Clause 12A. The device of any of clauses 8A-11A, wherein the device comprises one or more of a camera, a computer, a mobile device, a broadcast receiver device, or a set-top box.

Clause 13A. The device of any of clauses 8A-12A, wherein the device comprises a video decoder.

Clause 14A. The device of any of clauses 8A-13A, wherein the device comprises a video encoder.

Clause 15A. A computer-readable storage medium having stored thereon instructions that, when executed, cause one or more processors to perform the method of any of clauses 1A-7A.

Clause 16A. A device for encoding video data, the device comprising: means for determining a block of the video data is a transform skip block; means for coding the transform skip block using transform residual coding; and means for refraining from using dependent quantization and sign data hiding.

Clause 17A. A method of decoding, the method comprising: determining based on a syntax element in a sequence parameter set that a slice-level flag is present; determining based on the slice-level flag that transform residual coding is enabled for blocks of the slice.

Clause 18A. A method of decoding, the method comprising: determining based on a syntax element in a picture parameter set that a slice-level flag is present; determining based on the slice-level flag that transform residual coding is enabled for blocks of the slice.

Clause 19A. A method of decoding, the method comprising: determining based on a syntax element in a sequence parameter set that a picture-header-level flag is present; determining based on the picture-header-level flag that dependent quantization is enabled for the current picture.

Clause 20A. A method of decoding, the method comprising: determining based on a syntax element in a picture parameter set that a picture-header-level flag is present; determining based on the picture-header-level flag that dependent quantization is enabled for the current picture.

Clause 21A. A method of decoding, the method comprising: determining based on a syntax element in a sequence parameter set that a picture-header-level flag is present; determining based on the picture-header-level flag that sign bit hiding is enabled for the current picture.

Clause 22A. A method of decoding, the method comprising: determining based on a syntax element in a picture parameter set that a picture-header-level flag is present; determining based on the picture-header-level flag that sign bit hiding is enabled for the current picture.

Clause 23A. A method comprising any combination of clauses 17A-22A.

Clause 24A. A device for coding video data, the device comprising one or more means for performing the method of any of clauses 17A-23A.

Clause 25A. The device of clause 24A, wherein the one or more means comprise one or more processors implemented in circuitry.

Clause 26A. The device of clause 24A or 25A, further comprising a memory to store the video data.

Clause 27A. The device of any of clauses 24A-26A, further comprising a display configured to display decoded video data.

Clause 28A. The device of any of clauses 24A-27A, wherein the device comprises one or more of a camera, a computer, a mobile device, a broadcast receiver device, or a set-top box.

Clause 29A. The device of any of clauses 24A-28A, wherein the device comprises a video decoder.

Clause 1B. A method of decoding video data, the method comprising: receiving a first slice header syntax element for a slice of the video data; determining a first value for the first slice header syntax element, wherein the first value is indicative of whether dependent quantization is enabled for the slice; receiving a second slice header syntax element for the slice of the video data; determining a second value for the second slice header syntax element, wherein the second value is indicative of whether sign data hiding is enabled for the slice; determining whether transform skip residual coding is disabled for the slice based on the first value and the second value; and decoding the slice based on the determinations.

Clause 2B. The method of clause 1B, wherein determining whether transform skip residual coding is disabled for the slice comprises in response to one or both of the first value indicating that dependent quantization is enabled for the slice or the second value indicating that sign data hiding is enabled for the slice, determining that transform skip residual coding is enabled for the slice.

Clause 3B. The method of clause 2B, wherein determining that transform skip residual coding is enabled for the slice comprises: inferring that a third slice header syntax element indicative of whether transform skip residual coding is disabled for the slice is set to a value indicating that transform skip residual coding is enabled for the slice.

Clause 4B. The method of clause 3B, wherein decoding the slice comprises: in response to determining that a block of the slice is encoded in a transform skip mode, applying transform skip residual decoding to the block.

Clause 5B. The method of any combination of clauses 2B-4B, wherein the first value is equal to 1 or the second value is equal to 1.

Clause 6B. The method of clause 1B, wherein determining whether transform skip residual coding is disabled for the slice comprises: in response to the first value indicating that dependent quantization is disabled for the slice and the second value indicating that sign data hiding is disabled for the slice, receiving a third slice header syntax element indicative of whether transform skip residual coding is disabled for the slice.

Clause 7B. The method of clause 6B, wherein a third value for the third slice header syntax element indicates that transform skip residual coding is disabled for the slice, and wherein decoding the slice comprises: in response to determining that a block of the slice is encoded in a transform skip mode, decoding the block using transform residual coding while refraining from using dependent quantization and sign data hiding on the block.

Clause 8B. The method of clause 6B, wherein a third value for the third slice header syntax element indicates that transform skip residual coding is enabled for the slice, and wherein decoding the slice comprises: in response to determining that a block of the slice is encoded in a transform skip mode, applying transform skip residual decoding to the block.

Clause 9B. A device for decoding video data, the device comprising: memory configured to store the video data; and one or more processors implemented in circuitry and coupled to the memory, the one or more processors being configured to: receive a first slice header syntax element for a slice of the video data; determine a first value for the first slice header syntax element, wherein the first value is indicative of whether dependent quantization is enabled for the slice; receive a second slice header syntax element for the slice of the video data; determine a second value for the second slice header syntax element, wherein the second value is indicative of whether sign data hiding is enabled for the slice; determine whether transform skip residual coding is disabled for the slice based on the first value and the second value; and decode the slice based on the determinations.

Clause 10B. The device of clause 9B, wherein as part of determining that transform skip residual coding is enabled for the slice, the one or more processors are configured to: in response to one or both of the first value indicating that dependent quantization is enabled for the slice or the second value indicating that sign data hiding is enabled for the slice, determine that transform skip residual coding is enabled for the slice.

Clause 11B. The device of clause 10B, wherein as part of determining that transform skip residual coding is enabled for the slice, the one or more processors are configured to: infer that a third slice header syntax element indicative of whether transform skip residual coding is disabled for the slice is set to a value indicating that transform skip residual coding is enabled for the slice.

Clause 12B. The device of clause 11B, wherein as part of decoding the slice, the one or more processors are configured to: in response to determining that a block of the slice is encoded in a transform skip mode, apply transform skip residual decoding to the block.

Clause 13B. The device of any combination of clauses 10B-12B, wherein the first value is equal to 1 or the second value is equal to 1.

Clause 14B. The device of clause 9B, wherein as part of determining whether transform skip residual coding is disabled for the slice, the one or more processors are configured to: in response to the first value indicating that dependent quantization is disabled for the slice and the second value indicating that sign data hiding is disabled for the slice, receive a third slice header syntax element indicative of whether transform skip residual coding is disabled for the slice.

Clause 15B. The device of clause 14B, wherein a third value for the third slice header syntax element indicates that transform skip residual coding is disabled for the slice, and wherein as part of decoding the slice, the one or more processors are configured to: in response to determining that a block of the slice is encoded in a transform skip mode, decoding the block using transform residual coding while refraining from using dependent quantization and sign data hiding on the block.

Clause 16B. The device of clause 14B, wherein a third value for the third slice header syntax element indicates that transform skip residual coding is enabled for the slice, and wherein as part of decoding the slice, the one or more processors are configured to: in response to determining that a block of the slice is encoded in a transform skip mode, apply transform skip residual decoding to the block.

Clause 17B. The device of any combination of clauses 9B-16B, further comprising: a display coupled to the one or more processors, the display being configured to display the slice.

Clause 18B. The device of any combination of clauses 9B-17B, wherein the device comprises a mobile device.

Clause 19B. A non-transitory computer-readable storage medium having stored thereon instructions that, when executed, cause one or more processors to: receive a first slice header syntax element for a slice of video data; determine a first value for the first slice header syntax element, wherein the first value is indicative of whether dependent quantization is enabled for the slice; receive a second slice header syntax element for the slice of the video data; determine a second value for the second slice header syntax element, wherein the second value is indicative of whether sign data hiding is enabled for the slice; determine whether transform skip residual coding is disabled for the slice based on the first value and the second value; and decode the slice based on the determinations.

Clause 20B. A device for decoding video data, the device comprising: means for receiving a first slice header syntax element for a slice of the video data; means for determining a first value for the first slice header syntax element, wherein the first value is indicative of whether dependent quantization is enabled for the slice; means for receiving a second slice header syntax element for the slice of the video data; means for determining a second value for the second slice header syntax element, wherein the second value is indicative of whether sign data hiding is enabled for the slice; means for determining whether transform skip residual coding is disabled for the slice based on the first value and the second value; and means for decoding the slice based on the determinations.

Clause 21B. A method of encoding video data, the method comprising: determining whether to enable dependent quantization for a slice of the video data; determining whether to enable sign data hiding for the slice; based on the determination of whether to enable dependent quantization for the slice or the determination of whether to enable sign data hiding for the slice, determining whether to disable transform skip residual coding for the slice; and encoding the slice based on the determinations.

Clause 22B. The method of clause 21B, wherein determining whether to disable transform skip residual coding for the slice comprises in response to one or both determining that dependent quantization is enabled for the slice or determining that sign data hiding is enabled for the slice, determining that transform skip residual coding is enabled for the slice.

Clause 23B. The method of clause 22B, further comprising: refraining from signaling a third slice header syntax element indicative of whether transform skip residual coding is disabled for the slice.

Clause 24B. The method of clause 23B, wherein encoding the slice comprises: in response to determining to encode a block of the slice in a transform skip mode, applying transform skip residual decoding to the block.

Clause 25B. The method of clause 22B, further comprising: signaling a first slice header syntax element for the slice, wherein the first syntax element is indicative of whether dependent quantization is enabled for the slice; and signaling a second slice header syntax element for the slice, wherein the second value is indicative of whether sign data hiding is enabled for the slice, wherein the first value is equal to 1 or the second value is equal to 1.

Clause 26B. The method of clause 21B, further comprising: in response to determining to disable dependent quantization for the slice and determining to disable sign data hiding is disabled for the slice, signaling a third slice header syntax element indicative of whether transform skip residual coding is disabled for the slice.

Clause 27B. The method of clause 26B, wherein a third value for the third slice header syntax element indicates that transform skip residual coding is disabled for the slice, and wherein encoding the slice comprises: in response to determining to encode a block of the slice is encoded in a transform skip mode, refraining from using dependent quantization and sign data hiding on the block.

Clause 28B. The method of clause 27B, further comprising: in response to determining to encode a block of the slice in a transform skip mode, applying transform skip residual encoding to the block.

Clause 29B. A device for decoding video data, the device comprising: memory configured to store the video data; and one or more processors implemented in circuitry and coupled to the memory, the one or more processors being configured to: determine whether to enable dependent quantization for a slice of the video data; determine whether to enable sign data hiding for the slice; based on the determination of whether to enable dependent quantization for the slice or the determination of whether to enable sign data hiding for the slice, determine whether to disable transform skip residual coding for the slice; and encode the slice based on the determinations.

Clause 30B. The device of clause 29B, wherein as part of determining whether to disable transform skip residual coding for the slice, the one or more processors are configured to: in response to one or both determining that dependent quantization is enabled for the slice or determining that sign data hiding is enabled for the slice, determine that transform skip residual coding is enabled for the slice.

Clause 31B. The device of clause 29B, wherein the one or more processors are further configured to: refrain from signaling a third slice header syntax element indicative of whether transform skip residual coding is disabled for the slice.

Clause 32B. The device of clause 31B, wherein as part of encoding the slice the one or more processors are configured to: in response to determining to encode a block of the slice in a transform skip mode, apply transform skip residual encoding to the block.

Clause 33B. The device of clause 30B, wherein the one or more processors are further configured to: signal a first slice header syntax element for the slice, wherein the first syntax element is indicative of whether dependent quantization is enabled for the slice; and signal a second slice header syntax element for the slice, wherein the second value is indicative of whether sign data hiding is enabled for the slice, wherein the first value is equal to 1 or the second value is equal to 1.

Clause 34B. The device of clause 28B, wherein the one or more processors are further configured to: in response to determining to disable dependent quantization for the slice and determining to disable sign data hiding is disabled for the slice, signal a third slice header syntax element indicative of whether transform skip residual coding is disabled for the slice.

Clause 34B. The device of clause 33B, wherein a third value for the third slice header syntax element indicates that transform skip residual coding is disabled for the slice, and wherein as part of encoding the slice, the one or more processors are configured to: in response to determining to encode a block of the slice is encoded in a transform skip mode, refrain from using dependent quantization and sign data hiding on the block.

Clause 35B. The method of clause 34B, wherein the one or more processors are further configured to: in response to determining to encode a block of the slice in a transform skip mode, apply transform skip residual encoding to the block.

Clause 36B. The device of clause 29B, further comprising: a camera coupled to the one or more processors, the camera being configured to capture the video data.

Clause 37B. The device of clause 28B, wherein the device comprises a mobile device.

Clause 1C. A method comprising any combination of clauses 1A-7A, 17A-22A, 1B-8B, or 21B-28B.

Clause 2C. A device comprising any combination of clauses 8A-14A, 16A, 24A-29A, 9B-18B, 20B, or 29B-37B.

Clause 3C. A non-transitory computer readable storage media comprising any combination of clauses 15A and 19B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a first slice header syntax element for a slice of the video data;
   determining a first value for the first slice header syntax element, wherein the first value is indicative of whether dependent quantization is enabled for the slice;
   receiving a second slice header syntax element for the slice of the video data;
   determining a second value for the second slice header syntax element, wherein the second value is indicative of whether sign data hiding is enabled for the slice;
   determining whether transform skip residual coding is disabled for the slice in response to the first value and the second value;
   wherein determining whether transform skip residual coding is disabled for the slice comprises:
      in response to the first value indicating that dependent quantization is disabled for the slice and the second value indicating that sign data hiding is disabled for the slice, receiving a third slice header syntax element indicative of whether transform skip residual coding is disabled for the slice; and
   decoding the slice based on the determinations.

2. The method of claim 1, wherein determining whether transform skip residual coding is disabled for the slice comprises in response to one or both of the first value indicating that dependent quantization is enabled for the slice or the second value indicating that sign data hiding is enabled for the slice, determining that transform skip residual coding is enabled for the slice.

3. The method of claim 2, wherein determining that transform skip residual coding is enabled for the slice comprises:
   inferring that a third slice header syntax element indicative of whether transform skip residual coding is disabled for the slice is set to a value indicating that transform skip residual coding is enabled for the slice.

4. The method of claim 3, wherein decoding the slice comprises:
   in response to determining that a block of the slice is encoded in a transform skip mode, applying transform skip residual decoding to the block.

5. The method of claim 2, wherein the first value is equal to 1 or the second value is equal to 1.

6. The method of claim 1, wherein a third value for the third slice header syntax element indicates that transform skip residual coding is disabled for the slice, and wherein decoding the slice comprises: in response to determining that a block of the slice is encoded in a transform skip mode, decoding the block using transform residual coding while refraining from using dependent quantization and sign data hiding on the block.

7. The method of claim 1, wherein a third value for the third slice header syntax element indicates that transform skip residual coding is enabled for the slice, and wherein decoding the slice comprises: in response to determining that a block of the slice is encoded in a transform skip mode, applying transform skip residual decoding to the block.

8. A device for decoding video data, the device comprising:
   memory configured to store the video data; and
   one or more processors implemented in circuitry and coupled to the memory, the one or more processors being configured to:
   receive a first slice header syntax element for a slice of the video data;
   determine a first value for the first slice header syntax element, wherein the first value is indicative of whether dependent quantization is enabled for the slice;
   receive a second slice header syntax element for the slice of the video data;
   determine a second value for the second slice header syntax element, wherein the second value is indicative of whether sign data hiding is enabled for the slice;
   determine whether transform skip residual coding is disabled for the slice in response to the first value and the second value;
   wherein determining whether transform skip residual coding is disabled for the slice comprises:
      in response to the first value indicating that dependent quantization is disabled for the slice and the second value indicating that sign data hiding is disabled for the slice, receiving a third slice header syntax element indicative of whether transform skip residual coding is disabled for the slice; and
   decode the slice based on the determinations.

9. The device of claim 8, wherein as part of determining that transform skip residual coding is enabled for the slice, the one or more processors are configured to:
   in response to one or both of the first value indicating that dependent quantization is enabled for the slice or the second value indicating that sign data hiding is enabled for the slice, determine that transform skip residual coding is enabled for the slice.

10. The device of claim 9, wherein as part of determining that transform skip residual coding is enabled for the slice, the one or more processors are configured to:
   infer that a third slice header syntax element indicative of whether transform skip residual coding is disabled for the slice is set to a value indicating that transform skip residual coding is enabled for the slice.

11. The device of claim 10, wherein as part of decoding the slice, the one or more processors are configured to:
   in response to determining that a block of the slice is encoded in a transform skip mode, apply transform skip residual decoding to the block.

12. The device of claim 9, wherein the first value is equal to 1 or the second value is equal to 1.

13. The device of claim 8, wherein a third value for the third slice header syntax element indicates that transform skip residual coding is disabled for the slice, and wherein as part of decoding the slice, the one or more processors are configured to: in response to determining that a block of the slice is encoded in a transform skip mode, decoding the block using transform residual coding while refraining from using dependent quantization and sign data hiding on the block.

14. The device of claim 8, wherein a third value for the third slice header syntax element indicates that transform skip residual coding is enabled for the slice, and wherein as part of decoding the slice, the one or more processors are configured to: in response to determining that a block of the slice is encoded in a transform skip mode, apply transform skip residual decoding to the block.

15. The device of claim 8, further comprising:
   a display coupled to the one or more processors, the display being configured to display the slice.

16. The device of claim 8, wherein the device comprises a mobile device.

17. A method of encoding video data, the method comprising:
   determining whether to enable dependent quantization for a slice of the video data;
   determining whether to enable sign data hiding for the slice;
   in response to at least one of the determination of whether to enable dependent quantization for the slice or the determination of whether to enable sign data hiding for the slice, determining whether to disable transform skip residual coding for the slice;
   signaling a first slice header syntax element for the slice, wherein the first slice header syntax element has a first value that is indicative of whether dependent quantization is enabled for the slice;
   signaling a second slice header syntax element for the slice, wherein the second slice header syntax element has a second value that is indicative of whether sign data hiding is enabled for the slice;
   wherein determining whether transform skip residual coding is disabled for the slice comprises:
      in response to the first value indicating that dependent quantization is disabled for the slice and the second value indicating that sign data hiding is disabled for the slice, receiving a third slice header syntax element indicative of whether transform skip residual coding is disabled for the slice; and
   encoding the slice based on the determinations.

18. The method of claim 17, wherein determining whether to disable transform skip residual coding for the slice comprises in response to one or both determining that dependent quantization is enabled for the slice or determining that sign data hiding is enabled for the slice, determining that transform skip residual coding is enabled for the slice.

19. The method of claim 18, further comprising:
   refraining from signaling a third slice header syntax element indicative of whether transform skip residual coding is disabled for the slice.

20. The method of claim 19, wherein encoding the slice comprises:
in response to determining to encode a block of the slice in a transform skip mode, applying transform skip residual decoding to the block.

21. The method of claim 18, wherein the first value is equal to 1 or the second value is equal to 1.

22. The method of claim 17, wherein a third value for the third slice header syntax element indicates that transform skip residual coding is disabled for the slice, and wherein encoding the slice comprises: in response to determining to encode a block of the slice is encoded in a transform skip mode, refraining from using dependent quantization and sign data hiding on the block.

23. The method of claim 22, further comprising:
in response to determining to encode a block of the slice in a transform skip mode, applying transform skip residual encoding to the block.

24. A device for encoding video data, the device comprising:
memory configured to store the video data; and
one or more processors implemented in circuitry and coupled to the memory, the one or more processors being configured to:
determine whether to enable dependent quantization for a slice of the video data;
determine whether to enable sign data hiding for the slice;
in response to at least one of the determination of whether to enable dependent quantization for the slice or the determination of whether to enable sign data hiding for the slice, determine whether to disable transform skip residual coding for the slice;
signal a first slice header syntax element for the slice, wherein the first slice header syntax element has a first value that is indicative of whether dependent quantization is enabled for the slice; and
signal a second slice header syntax element for the slice, wherein the second slice header syntax element has a second value that is indicative of whether sign data hiding is enabled for the slice;
wherein determining whether transform skip residual coding is disabled for the slice comprises:
in response to the first value indicating that dependent quantization is disabled for the slice and the second value indicating that sign data hiding is disabled for the slice, receiving a third slice header syntax element indicative of whether transform skip residual coding is disabled for the slice; and
encode the slice based on the determinations.

25. The device of claim 24, wherein as part of determining whether to disable transform skip residual coding for the slice, the one or more processors are configured to:
in response to one or both determining that dependent quantization is enabled for the slice or determining that sign data hiding is enabled for the slice, determine that transform skip residual coding is enabled for the slice.

26. The device of claim 25, wherein the first value is equal to 1 or the second value is equal to 1.

27. The device of claim 24, wherein the one or more processors are further configured to:
refrain from signaling a third slice header syntax element indicative of whether transform skip residual coding is disabled for the slice.

28. The device of claim 27, wherein as part of encoding the slice, the one or more processors are configured to:
in response to determining to encode a block of the slice in a transform skip mode, apply transform skip residual encoding to the block.

29. The device of claim 24, wherein a third value for the third slice header syntax element indicates that transform skip residual coding is disabled for the slice, and wherein as part of encoding the slice, the one or more processors are configured to: in response to determining to encode a block of the slice is encoded in a transform skip mode, refrain from using dependent quantization and sign data hiding on the block.

30. The method of claim 24, wherein the one or more processors are further configured to: in response to determining to encode a block of the slice in a transform skip mode, apply transform skip residual encoding to the block.

31. The device of claim 24, further comprising:
a camera coupled to the one or more processors, the camera being configured to capture the video data.

32. The device of claim 24, wherein the device comprises a mobile device.

* * * * *